US010003994B2

(12) United States Patent
Han et al.

(10) Patent No.: US 10,003,994 B2
(45) Date of Patent: Jun. 19, 2018

(54) TECHNIQUES FOR IDENTIFYING PHYSICAL HYBRID AUTOMATIC REQUEST INDICATOR CHANNEL RESOURCES

(71) Applicant: INTEL IP CORPORATION, Santa Clara, CA (US)

(72) Inventors: Seunghee Han, San Jose, CA (US); Gang Xiong, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 29 days.

(21) Appl. No.: 15/022,484

(22) PCT Filed: Sep. 16, 2014

(86) PCT No.: PCT/US2014/055837
§ 371 (c)(1),
(2) Date: Mar. 16, 2016

(87) PCT Pub. No.: WO2015/042035
PCT Pub. Date: Mar. 26, 2015

(65) Prior Publication Data
US 2016/0234809 A1  Aug. 11, 2016

Related U.S. Application Data

(60) Provisional application No. 61/879,014, filed on Sep. 17, 2013.

(51) Int. Cl.
*H04J 11/00* (2006.01)
*H04W 28/02* (2009.01)
(Continued)

(52) U.S. Cl.
CPC ....... *H04W 28/0242* (2013.01); *G01S 5/0236* (2013.01); *H04B 7/2643* (2013.01);
(Continued)

(58) Field of Classification Search
CPC .............................. H04W 72/04; H04L 11/00
(Continued)

(56) References Cited

U.S. PATENT DOCUMENTS

2012/0039286 A1  2/2012 Okubo et al.
2012/0250663 A1  10/2012 Han et al.
(Continued)

FOREIGN PATENT DOCUMENTS

EP  2608613 A1  6/2013

OTHER PUBLICATIONS

Extended European Search Report received for European Patent Application No. 14846279.9, dated Apr. 28, 2017, 7 pages.

*Primary Examiner* — Iqbal Zaidi
(74) *Attorney, Agent, or Firm* — Patent Capital Group

(57) ABSTRACT

Examples may include techniques for a identifying physical hybrid automatic request (HARQ) indicator channel (PHICH) resources. A PHICH resource along with one or more additional PHICH may be identified for use to enhance coverage for user equipment to receive positive acknowledgements (ACKs) or negative acknowledgement (NAKs) from an evolved Node B (eNB). An ACK/NAK may be sent to the UE by the eNB responsive to receiving data over a physical uplink shared channel (PUSCH) established with the UE. Both the UE and the eNB may operate in compliance with one or more 3rd Generation Partnership Project (3GPP) Long Term Evolution (LTE) standards.

21 Claims, 13 Drawing Sheets

(51) Int. Cl.
*H04W 4/14* (2009.01)
*H04L 5/00* (2006.01)
*H04W 24/10* (2009.01)
*H04W 36/00* (2009.01)
*H04W 36/04* (2009.01)
*G01S 5/02* (2010.01)
*H04W 64/00* (2009.01)
*H04J 3/02* (2006.01)
*H04W 72/04* (2009.01)
*H04B 7/26* (2006.01)
*H04L 1/18* (2006.01)
*H04L 5/14* (2006.01)
*H04W 4/00* (2018.01)
*H04J 13/00* (2011.01)
*H04L 27/26* (2006.01)
*H04W 28/12* (2009.01)

(52) U.S. Cl.
CPC ............ *H04J 3/02* (2013.01); *H04J 13/0048* (2013.01); *H04L 1/1893* (2013.01); *H04L 5/003* (2013.01); *H04L 5/0048* (2013.01); *H04L 5/0051* (2013.01); *H04L 5/14* (2013.01); *H04L 27/2601* (2013.01); *H04W 4/005* (2013.01); *H04W 4/14* (2013.01); *H04W 4/70* (2018.02); *H04W 24/10* (2013.01); *H04W 28/0236* (2013.01); *H04W 28/0247* (2013.01); *H04W 28/0268* (2013.01); *H04W 36/0083* (2013.01); *H04W 36/04* (2013.01); *H04W 64/00* (2013.01); *H04W 72/042* (2013.01); *H04W 72/0446* (2013.01); *H04W 72/0466* (2013.01); *H04W 28/12* (2013.01)

(58) Field of Classification Search
USPC .................................................. 370/209–339
See application file for complete search history.

(56) References Cited

U.S. PATENT DOCUMENTS

| | | |
|---|---|---|
| 2013/0051371 A1 | 2/2013 | Ko et al. |
| 2013/0223297 A1 | 8/2013 | Zhang et al. |
| 2013/0301401 A1* | 11/2013 | Wang ............... H04L 5/001 370/209 |
| 2014/0092794 A1 | 4/2014 | Yang et al. |
| 2014/0126499 A1* | 5/2014 | Li .................... H04L 5/0094 370/329 |

* cited by examiner

*HARQ Flow 200*

*HARQ Coding 300*

| HI | HI code word $<b_0,b_1,b_2>$ |
|---|---|
| 0 (NACK) | <0,0,0> |
| 1 (ACK) | <1,1,1> |

*800*

```
RECEIVE, AT AN UE CAPABLE OF OPERATING IN COMPLIANCE WITH ONE
OR MORE 3GPP LTE STANDARDS INCLUDING LTE-A, INFORMATION TO
          ESTABLISH A PUSCH WITH AN eNB
                      802
```

```
DETERMINE BASED ON THE INFORMATION AN IDENTIFICATION OF A
PHICH RESOURCE REPRESENTED BY AN INDEX PAIR INCLUDING A PHICH
   GROUP NUMBER FOR A PHICH GROUP AND A PHICH SEQUENCE
                           804
```

```
 IDENTIFY ONE OR MORE ADDITIONAL PHICH RESOURCES BASED ON
FURTHER INFORMATION RECEIVED FROM THE ENB OR USING A RULE-
                     BASED ASSIGNMENT
                           806
```

*FIG. 8*

Storage Medium 900

*Computer Executable Instructions for 800*

SEND, AT AN eNB CAPABLE OF OPERATING IN COMPLIANCE WITH ONE OR MORE 3GPP LTE STANDARDS INCLUDING LTE-A, INFORMATION THAT INCLUDES AN ASSIGNED PHICH RESOURCE REPRESENTED BY AN INDEX PAIR INCLUDING A PHICH GROUP NUMBER FOR A PHICH GROUP AND A PHICH SEQUENCE
1102

ASSIGN ONE OR MORE ADDITIONAL PHICH RESOURCES TO THE UE BASED A SET NUMBER PHICH RESOURCES OR AN ADJUSTABLE NUMBER OF PHICH RESOURCES
1104

ESTABLISH A PUSCH WITH THE UE BASED, AT LEAST IN PART, ON THE ASSIGNED PHICH RESOURCE AND THE ASSIGNED ONE OR MORE ADDITIONAL PHICH RESOURCES
1106

*FIG. 11*

Storage Medium 1200

*Computer Executable Instructions for 1100*

*FIG. 12*

TECHNIQUES FOR IDENTIFYING PHYSICAL HYBRID AUTOMATIC REQUEST INDICATOR CHANNEL RESOURCES

RELATED CASE

This application claims priority to U.S. Provisional Patent Application No. 61/879,014 filed on Sep. 17, 2013, that is hereby incorporated by reference in its entirety.

TECHNICAL FIELD

Examples described herein are generally related to wireless communication devices.

BACKGROUND

With a wide range of potential applications, machine type communication (MTC) or machine to machine (M2M) communication is gaining a tremendous interest among mobile network operators, equipment vendors, MTC specialist companies, and research bodies. The idea of M2M communications is to enable M2M components to be interconnected, networked, and controlled remotely with low-cost scalable and reliable technologies. M2M communication could be carried over mobile networks (e.g. GSM-GPRS, CDMA EVDO networks). In the M2M communication, the role of mobile network is largely confined to serve as a transport network.

M2M devices or user equipment (UEs) coupled to a mobile network may be capable of replying to requests for data contained within these types of UEs. These UEs may also be capable of transmitting data autonomously and parameters defining what or when data is transmitted may be adjusted or updated responsive to trigger messages. In some instances a physical hybrid automatic request (HARQ) indicator channel (PHICH) may be used (e.g., by a base station) to send acknowledgments (ACKs) or negative acknowledgement (NAKs) to these UEs responsive to successfully or unsuccessfully receiving transmitted data via an established physical uplink shared channel (PUSCH).

BRIEF DESCRIPTION OF THE DRAWINGS

FIG. 8 illustrates an example of a first logic flow.
FIG. 9 illustrates an example of a first storage medium.
FIG. 11 illustrates an example of a second logic flow.
FIG. 12 illustrates an example of a second storage medium.

DETAILED DESCRIPTION

Figure 1:
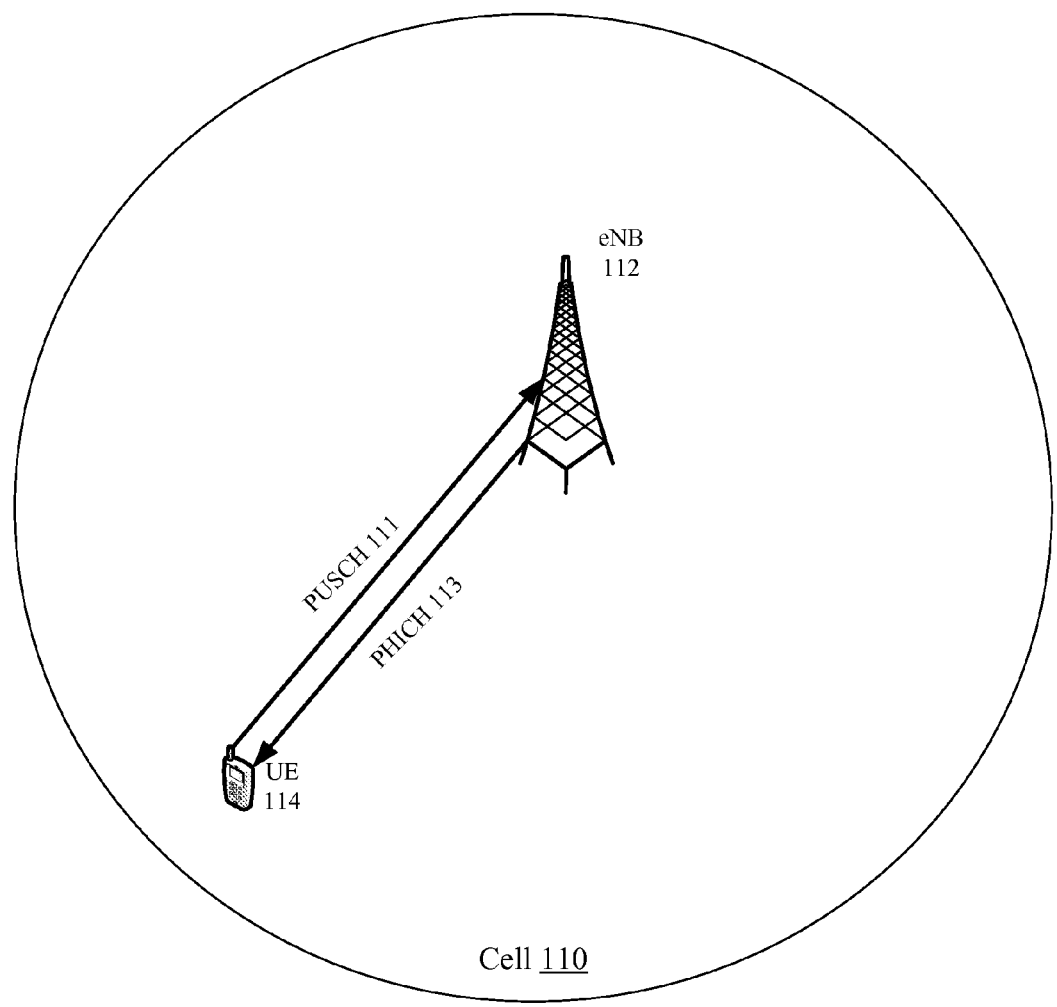
FIG. 1 illustrates an example of a system.

Examples are generally directed to improvements that may involve use of wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, M2M devices or UEs may be capable of replying to a request for data contained within these types of UEs and transmit data to a base station or eNB via an established PUSCH. Also, a PHICH may be used by the base station or eNB to send ACKs or NAKs to indicate successful or unsuccessful receipt of the transmitted data. M2M devices are typically low cost and/or low power wireless devices. Low cost and/or low power may limit a coverage area or amount of distance these types of UEs may be in relation to the eNB. For example, lower power receiving circuitry may result in a failure to receive at least some ACKs and may lead to multiple retransmissions to the eNB until an ACK is received. Current 3GPP LTE PHICH structures used by other types of UEs may not allow for ways to repeat the PHICH to decrease the likelihood that M2M devices or UEs fail to receive ACKs or NAKs and hence enhance PHICH coverage. It is with respect to these and other challenges that the examples described herein are needed.

In some first examples, techniques may be implemented for identifying PHICH resources that include receiving, at an UE capable of operating in compliance with one or more 3GPP LTE standards including LTE-A, information that includes an identification of a PHICH resource represented by an index pair including a PHICH group number for a PHICH group and a PHICH sequence. The techniques may also include identifying one or more additional PHICH resources based on further information received from the eNB or the UE using a rule-based assignment.

In some second examples, techniques may be implemented for sending, at an eNB capable of operating in compliance with one or more 3GPP LTE standards including LTE-A, information to an UE that includes an assigned PHICH resource represented by an index pair including a PHICH group number for a PHICH group and a PHICH sequence. The techniques may also include assigning one or more additional PHICH resources to the UE based a set of number of PHICH resources or an adjustable number of PHICH resources. The techniques may also include establishing a PUSCH with the UE based, at least in part, on the assigned PHICH resource and the assigned one or more additional PHICH resources.

FIG. 1 illustrates an example system 100. In some examples, system 100 may be arranged to operate in compliance with one or more 3GPP LTE standards including LTE-A. For these examples, as shown in FIG. 1, system 100 may include a cell 110 having an eNB 112 and a UE 114. UE 114 may establish a PUSCH 111 with eNB 112 to transmit data to eNB 112. A PHICH 113 may be used by eNB 112 to send ACK or NAK to indicate successful or unsuccessful receipt of the transmitted data received over PUSCH 111.

In some examples, UE 114 may include logic and/or features to receive information to establish PUSCH 111 and then determine based, at least in part, on that information an identification of a PHICH resource. As described in more detail below, the PHICH resource may be represented by an index pair including a PHICH group number for a PHICH group and a PHICH sequence. According to some examples, UE 114 and/or eNB 112 may be able to identify one or more additional PHICH resources based on further information received from eNB 112 or the use of a rule-based assignment. The further information may include identification of a number of identified index pairs for use by UE 114 to enhance coverage via PHICH 113. UE 114 may then determine whether to use all or some of the number of identified index pairs. UE 114 may then indicate to eNB 112 which index pairs will be used.

According to some examples, eNB 112 may include logic and/or features to send the information to UE 114 that assigns the PHICH resource. Also, eNB 112 may assign one or more additional PHICH resources to the UE based on a set number of PHICH resources or an adjustable number of PHICH resources. For these examples, eNB 112 may then establish PUSCH 111 based, at least in part, on the assigned PHICH resource and the assigned one or more additional PHICH resources. In some examples, eNB 112 may use a rule-based assignment to assign the one or more additional PHICH resources to UE 114.

According to some examples, UE 114 may be any electronic device having wireless capabilities or equipment. For some examples, UE 114 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

Figures 2, 3:
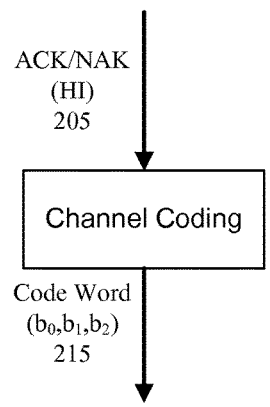
FIG. 2 illustrates an example HARQ flow.
FIG. 3 illustrates an example HARQ coding.

FIG. 2 illustrates an example HARQ flow 200. In some examples, as shown in FIG. 2, HARQ flow 200 includes an ACK/NAK 205 going through channel coding and coming out as a m code word 215 that goes through a repetition coding with a 1/3 rate ($b_0$, $b_1$, $b_2$). For these examples, channel coding for a HARQ indicator (HI) such as ACK/NAK 205 may be conveyed to an UE (e.g., UE 114) via a PHICH (e.g., PHICH 111). A positive acknowledgement (ACK) may have HI=1 and a negative acknowledgement (NAK) may have HI=0.

FIG. 3 illustrates an example HARQ coding 300. In some examples, as shown in FIG. 3, HARQ coding 300 indicates an HI code word of <0,0,0> for a NACK and <1,1,1> for ACK. Each bit may be modulated by BPSK and repeated for spreading with a PHICH sequence having a given spreading factor (SF). Then, each spread BPSK symbol (2 or 4 bits depending on SF) may be transmitted in a frequency domain by distributed manner to obtain a frequency diversity gain. Also, cell-specific scrambling may be applied to randomize inter-cell interference. Therefore, one HI may be transmitted via one PHICH resource that is represented by a PHICH group number and a PHICH sequence.

Figure 4:
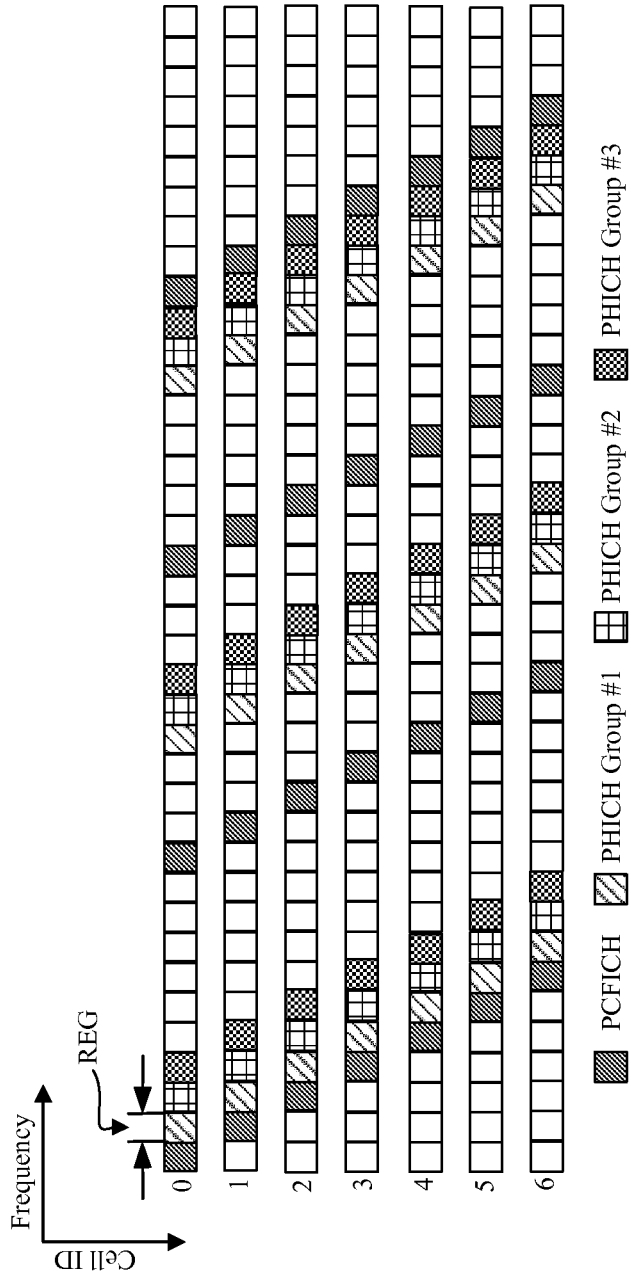
FIG. 4 illustrates an example PHICH transmission scheme.

FIG. 4 illustrates an example PHICH transmission scheme 400. In some examples, as shown in FIG. 4, PHICH transmission scheme 400 may include three PHICH groups 1-3 each having a PHICH duration=1. This example may assume 20 physical resource blocks (PRBs) that may be frequency shifted one resource element group (REG) between cell identifications (IDs) 0-6. Also, as shown in FIG. 4, a physical control format indicator channel (PC-FICH) may be located, for example, in the first symbol of each subframe.

According to some examples, a PHICH resource may be represented by an index pair that includes a PHICH group and a PHICH sequence. For these examples, the identity of the index pair may be depicted as ($n_{PHICH}^{group}$, $n_{PHICH}^{seq}$) Determination of the value for this index pair may be in accordance with one or more 3GPP LTE standards or specifications such as technical specification (TS) 36.213 entitled, "Technical Specification Group Radio Access Network; Evolved Universal Terrestrial Radio Access (E-UTRA); Physical layer procedures (Release 12)", published in December 2013, and/or previous or subsequent releases or versions (hereinafter referred to as 3GPP TS 36.213).

In some examples, assuming an SF=4, there may be 12 PHICH resources in a cell in total. For these examples, 12 PHICH resources may be used to enhance PHICH for an UE (e.g., UE 114) to enhance coverage for a PUSCH established with an eNB (e.g., eNB 112). All or at least some of these 12 PHICH resources may be utilized by the UE for needed or required coverage enhancement (e.g., low powered device). In some implementations, basic physical chain/processes including channel coding, scrambling, spreading, etc. may be reused. However, more PHICH resources are available to support a PHICH between the eNB and the UE while keeping backward compatibility. Also, for these examples, an effective coding rate may be reduced from 1/12 to 1/144 which may imply that a potential performance enhancement may occur with this lower coding rate.

According to some examples, multiple PHICH resources to support a PHICH between an UE and eNB may be provided via higher layer signaling, (e.g., radio resource control (RRC)) or may be provided via a predetermined manner. Providing via higher layer signaling may allow for assignment of an adjustable number of PHICH resources to support the PHICH in order to establish or maintain an established PUSCH. PHICH resources may be identified as ($n_{PHICH}^{group}$, $n_{PHICH}^{seq}$) The eNB may assign multiple PHICH resources for use to enhance coverage for the UE via an established PUSCH. The multiple PHICH resources may then be used to convey HI to the UE for these coverage enhancement purposes.

In some examples, according to 3GPP TS 36.213 a PHICH resource may be depicted as ($n_{PHICH}^{group}$, $n_{PHICH}^{seq}$), where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}.$$

According to 3 GPP TS 36.213, $n_{DMRS}$ may be mapped from a cyclic shift for a demodulation reference signal (DMRS) field in a most recent physical downlink control channel (PDCCH) with uplink downlink control information (DCI) format for one or more transport blocks (TBs) associated with a corresponding PUSCH transmission. Also, $N_{SF}^{PHICH}$ may be a spreading factor size used for PHICH modulation. $N_{PHICH}^{group}$ may be a number of PHICH groups configured based on higher layer signaling with the eNB. Also, $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0. Also, $I_{PRB\_RA}=I_{PRB\_RA}^{lowest\_index}$ for a first TB of a PUSCH with associated PDCCH or for a case of no associated PDCCH when a number of negatively acknowledged TBs is not equal to a number of TBs indicated in a most recent PDCCH associated with a corresponding PUSCH or $I_{PRB\_RA}=I_{PRB\_RA}^{lowest\_index}+1$ for a second TB of a PUSCH with associated PDCCH.

According to some examples, MTM devices or UEs may not be arranged for or capable of supporting two-TB transmissions using uplink multiple-input and multiple-output (UL-MIMO). For these examples, no resource allocation rule for a second TB may apply. Thus, only $I_{PRB\_RA}=I_{PRB\_RA}^{lowest\_index}$ may be available. As a result of no second TB, a lowest PRB index based PHICH resource allocation will be assumed for example rule-based assignments for determining PHICH resource allocations as described more below.

In some examples, multiple PHICH resources may be assigned to an UE in need of coverage enhancement to establish and/or maintain a PUSCH for transmissions to an eNB. For these examples, a number of PHICH resources may be allocated for use to convey HI to the UE responsive to data transmissions sent via the established PUSCH. The PHICH resources may be identified as index pairs ($n_{PHICH}^{group}$,$n_{PHICH}^{seq}$). According to some examples, the UE may include logic and/or features to determine whether to use all of or some of the number of PHICH resources from the allocated PHICH resources and then to indicate to the eNB which index pairs to use from among the identified index pairs. For example, if the identified index pairs for assigned PHICH resources are (0,0), (1,1), (2,2), and (0,0), the UE may choose to use the index pair identified as (0,0) only once. Hence, the UE determines to use only 3 of the 4 assigned PHICH resources and may indicate that determination to the eNB for use to convey HI to the UE.

According to some examples, considering that a PHICH resource may be tied to a lowest PRB index of PUSCH, some PHICH resources may correspond to the PRB indices other than the lowest PRB index. Therefore, a number of multiple PHICH resources may be determined by a given number of PRBs for PUSCH. For example, if the given number of PRBs for PUSCH=4, then four PHICH resources corresponding to $I_{PRB\_RA}^{lowest\_index}$, $I_{PRB\_RA}^{lowest\_index}=1$, $I_{PRB\_RA}^{lowest\_index}+2$, $I_{PRB\_RA}^{lowest\_index}+3$ may be used for multiple PHICH resource allocations to enhance PHICH performance and/or coverage. If the PHICH performance and/or coverage enhancement is not acceptable or sufficient, a time domain repetition may be further applied.

In some examples, a predetermined or fix total number of PHICH resources may be assigned by the eNB and that total number may be represented by "N", where N is any whole positive integer greater than 1. Assuming that at least one PHICH is assigned, additional PHICH resource(s) may then be represented by "N-1". The number of additional PHICH resources may be represented by "p", where p may be any whole positive integer with a value of 1 to 1-N (e.g., p=1, 2, 3, . . . , N-1).

According to some examples, assignment of "p" additional resources may include using a first rule-based assignment to identify the one or more additional PHICH resources. The first rule-based assignment may include determining an identity in a consecutive manner by increasing $I_{PRB\_RA}^{lowest\_index}$ such that $$n_{PHICH}^{group} = (I_{PRB\_RA} + p + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA} + p}{n_{PHICH}^{group}} \right\rfloor + n_{DMRS} \right) \bmod 2N_{SF}^{PHICH}.$$

In some examples, assignment of "p" additional resources may include using a second rule-based assignment to identify the one or more additional PHICH resources. The second rule-based assignment may include determining an identity in a consecutive manner by decreasing $I_{PRB\_RA}^{lowest\_index}$ such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} - p}{n_{PHICH}^{group}} \right\rfloor + n_{DMRS}\right) \bmod 2N_{SF}^{PHICH}.$$

According to some examples, assignment of "p" additional resources may include using a third rule-based assignment to identify the one or more additional PHICH resource. The third rule-based assignment may include determining an identity in a consecutive manner by increasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} + p\right) \bmod 2N_{SF}^{PHICH}.$$

In some examples, assignment of "p" additional resources may include using a fourth rule-based assignment to identify the one or more additional PHICH resources. The fourth rule-based assignment may include determining an identity in a consecutive manner by decreasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} - p\right) \bmod 2N_{SF}^{PHICH}.$$

According to some examples, assignment of "p" additional resources may include using a fifth rule-based assignment to identify the one or more additional PHICH resources. The fifth rule-based assignment may include determining an identity in a consecutive manner by increasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$.

In some examples, assignment of "p" additional resources may include using a sixth rule-based assignment to identify the one or more additional PHICH resources. The sixth rule-based assignment including determining an identity in a consecutive manner by decreasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$.

In some examples, assignment of "p" additional resources may include using a seventh rule-based assignment to identify the one or more additional PHICH resources. The seventh rule-based assignment to include determining an identity in a consecutive manner by increasing either PHICH group number or PHICH sequence such that $$n_{PHICH}^{group} = (I_{PRB\_RA} + p + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} + p}{n_{PHICH}^{group}} \right\rfloor + n_{DMRS}\right) \bmod 2N_{SF}^{PHICH}.$$

According to some examples, assignment of "p" additional resources may include using an eighth rule-based assignment to identify the one or more additional PHICH resources. The eighth rule-based assignment to include determining an identity in a consecutive manner by decreasing either PHICH group number or PHICH sequence such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} - p}{n_{PHICH}^{group}} \right\rfloor + n_{DMRS}\right) \bmod 2N_{SF}^{PHICH}.$$

In some examples, assignment of "p" additional resources may include using a ninth rule-based assignment to identify the one or more additional PHICH resources. The ninth rule-based assignment to include determining an identity in a consecutive manner by increasing either PHICH group number or PHICH sequence such that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} + p\right) \bmod 2N_{SF}^{PHICH}.$$

According to some examples, assignment of "p" additional resources may include using a tenth rule-based assignment to identify the one or more additional PHICH resources. The tenth rule-based assignment to include determining an identity in a consecutive manner by decreasing either PHICH group number or PHICH sequence such that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} - p}{n_{PHICH}^{group}} \right\rfloor + n_{DMRS} - p\right) \bmod 2N_{SF}^{PHICH}.$$

In some examples, assignment of "p" additional resources may include using an eleventh rule-based assignment to identify the one or more additional PHICH resources. The eleventh rule-based assignment to include determining an identity in a consecutive manner by increasing either PHICH group number or PHICH sequence such that $n_{PHICH}^{group} = (n_{PHICH}^{group} + p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$.

According to some examples, assignment of "p" additional resources may include using a twelfth rule-based assignment to identify the one or more additional PHICH resources. The twelfth rule-based assignment to include determining an identity in a consecutive manner by increasing either PHICH group number or PHICH sequence such that $n_{PHICH}^{group} = (n_{PHICH}^{group} - p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group} - p) \bmod N_{PHICH}^{group}$ and $n_{PHICH}^{seq} = (n_{PHICH}^{seq} - p) \bmod 2N_{SF}^{PHICH}$ where p is any whole positive integer with a value of 1 to N−1.

Figure 5:
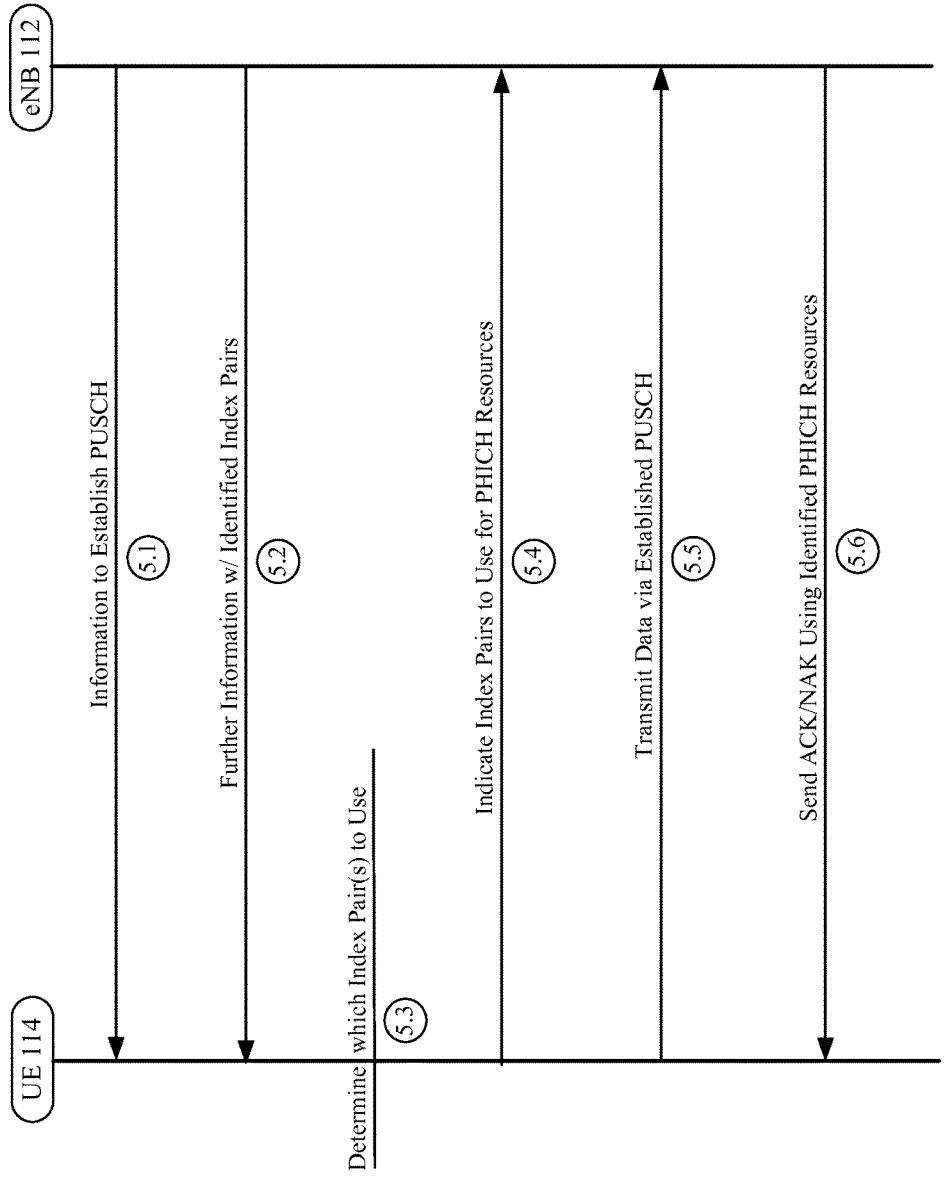
FIG. 5 illustrates an example first process.

FIG. 5 illustrates a first example process. In some examples, as shown in FIG. 5, the first example process includes process 500. Process 500 may be for an eNB to provide a predetermined or adjustable number of PHICH resources for use to enhance PHICH coverage by an UE coupled to the eNB via a PUSCH. For these examples, elements of system 100 as shown in FIG. 1 such as UE 114, eNB 112, PUSCH 111 and PHICH 113 may be related to process 500. However, the example process 500 is not limited to implementations using elements of system 100.

Beginning at process 5.1 (Information to Establish PUSCH), logic and/or features at eNB 112 may be capable of sending information to UE 114 to establish PUSCH 111. In some examples, the information may include an identification of a PHICH resource represented by an index pair pairs ($n_{PHICH}^{group}$, $n_{PHICH}^{seq}$). For these examples, eNB 112 may assign the index pair for use to convey ACK/NAK or HI to UE 114 over PHICH 113 responsive to receiving data via the established PUSCH 111.

Moving to process 5.2 (Further Information w/Identified Index Pairs), logic and/or features at eNB 112 may be arranged to send further information with identified index pairs to UE 114. According to some examples, these identified index pairs may be for one or more additional PHICH resources assigned to enhance coverage for UE 114 via PUSCH 111.

Moving to process 5.3 (Determine which Index Pair(s) to Use), logic and/or features at UE 114 may be capable of determining which index pair(s) to use. In some examples, UE 114 may decide to use all or some of the identified additional index pairs. A portion of the identified additional index pairs may be used if UE 114 determines that needed coverage enhancements can be meet with just the portion of identified index pairs.

Moving to process 5.4 (Indicate Index Pairs to Use for PHICH Resources), logic and/or features at UE 114 may be capable of indicating to eNB 112 what index pairs are to be used for PHICH resources.

Moving to process 5.5 (Transmit Data via Established PUSCH), UE 114 may then transmit data via the established PUSCH 111.

Moving to process 5.6 (Send ACK/NAK Using Identified PHICH Resources), eNB 112 may send ACK/NAK (HI) using identified PHICH resources via PHICH 113. Process 500 may then come to an end.

Figure 6:
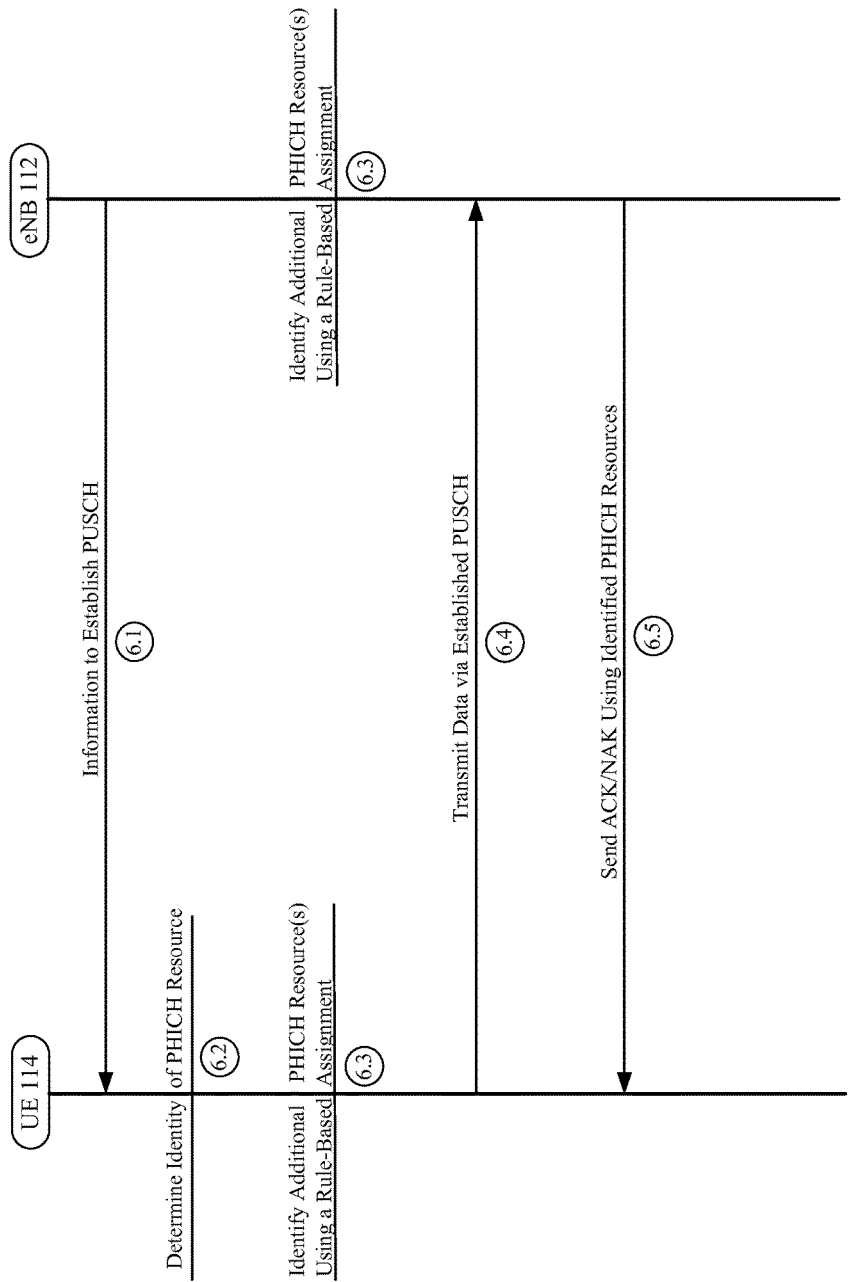
FIG. 6 illustrates an example second process.

FIG. 6 illustrates a second example process. In some examples, as shown in FIG. 6, the second example process includes process 600. Process 600 may be for an eNB to provide a predetermined or set number of PHICH resources according to a rule-based assignment for use to enhance PHICH coverage by an UE coupled to the eNB via a PUSCH. For these examples, elements of system 100 as shown in FIG. 1 such as UE 114, eNB 112, PUSCH 111 and PHICH 113 may be related to process 600. However, the example process 600 is not limited to implementations using elements of system 100.

Beginning at process 6.1 (Information to Establish PUSCH), logic and/or features at eNB 112 may be capable of sending information to UE 114 to establish PUSCH 111. In some examples, the information may include information to enable UE 114 to identify a PHICH resource represented by an index pair pairs ($n_{PHICH}^{group}$, $n_{PHICH}^{seq}$). For these examples, eNB 112 may assign the index pair for use to convey ACK/NAK or HI to UE 114 over PHICH 113 responsive to receiving data via the established PUSCH 111.

Moving to process 6.2 (Determine Identity of PHICH Resource), logic and/or features at UE 114 may be capable of determining the identity of the PHICH resource based on the index pair ($n_{PHICH}^{group}$, $n_{PHICH}^{seq}$) In some examples, a value for this index pair may be determined in accordance with 3GPP TS 36.213 as described above for FIG. 4.

Moving to process 6.3 (Identify Additional PHICH Resource(s) Using a Rule-Based Assignment), logic and/or features at UE 114 and/or eNB 112 may be capable of identifying one or more additional PHICH resources using a rule-based assignment. In some examples, any one of the twelve example rule-based assignments described above may be used by UE 114 and/or eNB 112 to identify the one or more additional PHICH resources.

Moving to process 6.4 (Transmit Data via Established PUSCH), UE 114 may then transmit data via the established PUSCH 111.

Moving to process 6.5 (Send ACK/NAK Using Identified PHICH Resources), eNB 112 may send ACK/NAK (HI) using identified PHICH resources via PHICH 113. Process 600 may then come to an end.

Figure 7:
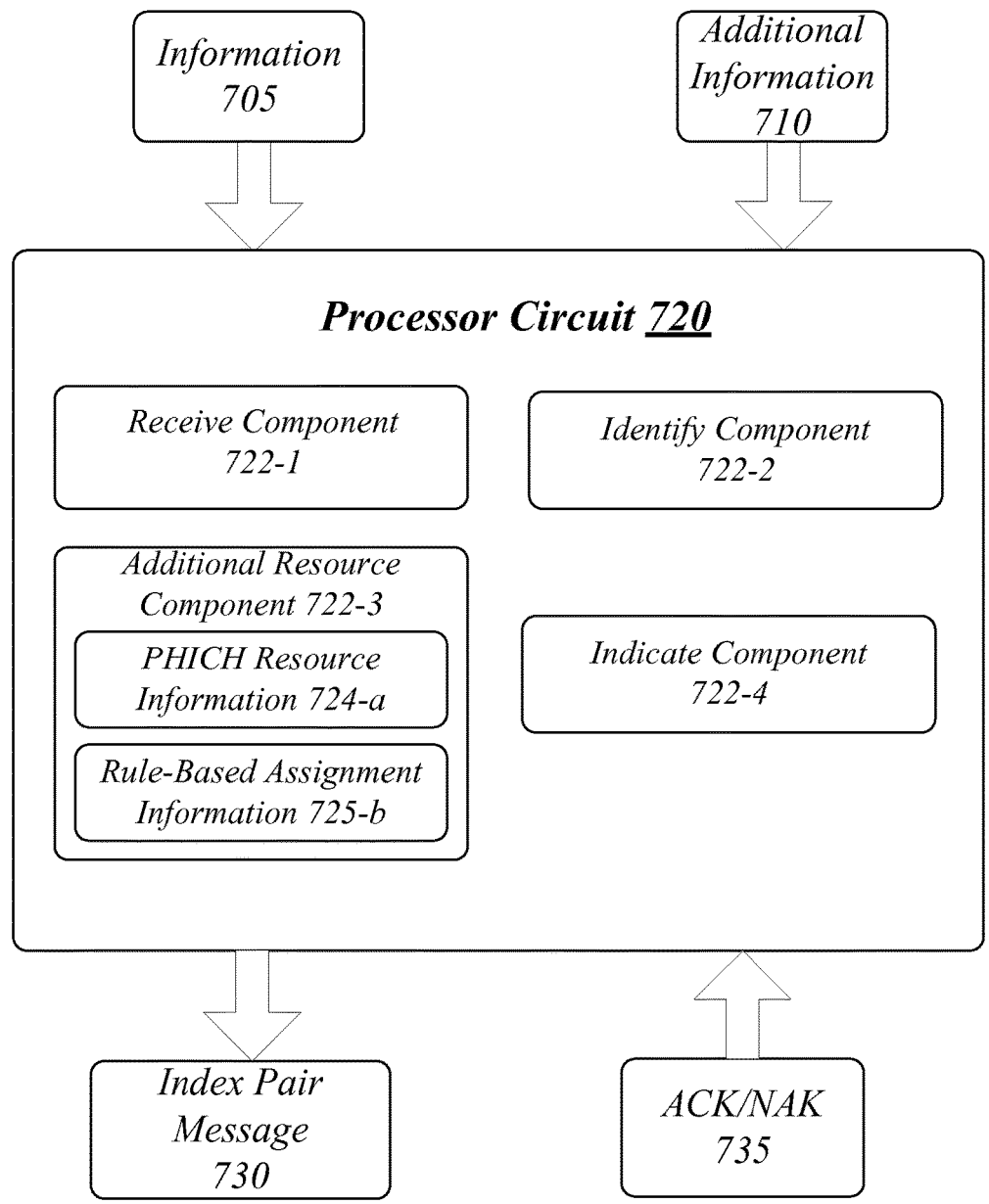
FIG. 7 illustrates an example block diagram for a first apparatus.

FIG. 7 illustrates a block diagram for an example first apparatus. As shown in FIG. 7, the example first apparatus includes apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may comprise a computer-implemented apparatus 700 having a processor circuit 720 arranged to execute one or more software components 722-*a*. It is worthy to note that "a" and "b" and "c" and similar designators as used herein are intended to be variables representing any positive integer. Thus, for example, if an implementation sets a value m for a=4, then a complete set of software components 722-*a* may include components 722-1, 722-2, 722-3 or 722-4. The examples are not limited in this context.

According to some examples, apparatus 700 may be implemented in an UE (e.g., UE 114) capable of operating in compliance with one or more 3GPP LTE Specifications including LTE-A. The examples are not limited in this context.

In some examples, as shown in FIG. 7, apparatus 700 includes processor circuit 720. Processor circuit 720 may be generally arranged to execute one or more software components 722-*a*. The processing circuit 720 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 720. According to some examples, processor circuit 720 may also be an application specific integrated circuit (ASIC) and at least some components 722-*a* may be implemented as hardware elements of the ASIC.

According to some examples, apparatus 700 may include a receive component 722-1. Receive component 722-1 may be executed by processor circuit 720 to receive information for an UE including apparatus 700 to establish a PUSCH with an eNB. For these examples, the information may be included in information 705.

In some examples, apparatus 700 may also include an identify component 722-2. Identify component 722-2 may be executed by processor circuit 720 to determine based on the information received from the eNB an identification of a PHICH resource represented by an index pair including a PHICH group number for a PHICH group and a PHICH sequence. The information may also indicate a total number PHICH resources that may be available for enhancing PHICH coverage for the UE including apparatus 700.

According to some examples, apparatus 700 may also include an additional resource component 722-3. Additional resource component 722-3 may be executed by processor circuit 720 to identify one or more additional PHICH resources based on further information received from the eNB by receive component 722-1 or use of a rule-based assignment. For examples where further information is used to identify the one or more additional PHICH resources, the further information may be included in additional information 710. The further information may be maintained by additional resource component 722-3 in PHICH resource information 724-*a* (e.g., in a data structure such as a lookup table (LUT)). The further information may include a number of identified index pairs for use as additional PHICH resources to enhance coverage for the UE including apparatus 700. Also, the total number of PHICH resources received with information 705 may be included with PHICH resource information 724-*a*.

For examples where a rule-based assignment is used to identify one or more additional PHICH resources, additional resource component 722-3 may be capable of using any one of the twelve example rule-based assignments described above for FIG. 4 to identify the one or more additional resources. Additional resource component 722-3 may maintain information related to these assignments in ruled-based assignment information 725-*b* (e.g., in a LUT).

In some examples, apparatus 700 may also include an indicate component 722-4. Indicate component 722-4 may be executed by processor circuit 720 to indicate to the eNB which index pairs to use in examples where additional resource component 722-3 determines what additional resource(s) that are to be used. For these examples, additional resource component 722-3 may have selected all or some of the one or more additional PHICH resources indicated by the eNB with additional information 710. Indicate component 722-4 may indicate the index pairs in index message 730.

According to some examples, the eNB may use the PHICH resources identified by identify component 722-2 and additional resource component 722-3 to convey HI responsive to data transmissions sent via an established PUSCH. For these examples, the HI may be included in ACK/NAK 735.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a logic flow 800. Logic flow 800 may be representative of some or all of the operations executed by one or more logic, features, or devices described herein, such as apparatus 700. More particularly, logic flow 800 may be implemented by receive component 722-1, identify component 722-2, additional resource component 722-3 or indicate component 722-4 for apparatus 700 located at or with an UE.

In the illustrated example shown in FIG. 8, logic flow 800 at block 802 may receive, at an UE capable of operating in compliance with one or more 3GPP LTE standards including LTE-A, information to establish a PUSCH with an eNB. In some examples, receive component 722-1 may receive the information from the eNB.

According to some examples, logic flow 800 at block 804 may determine based on the information an identification of a PHICH resource represented by an index pair including a PHICH group number for a PHICH group and a PHICH sequence. For these examples, identify component 1522-2 may determine the identification of the PHICH resource.

In some examples, logic flow 800 at block 806 may identify one or more additional resources based on further information received from the eNB or using a rule-based assignment. For these examples, additional resource component 722-3 may identify the one or more additional resources.

FIG. 9 illustrates an embodiment of a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
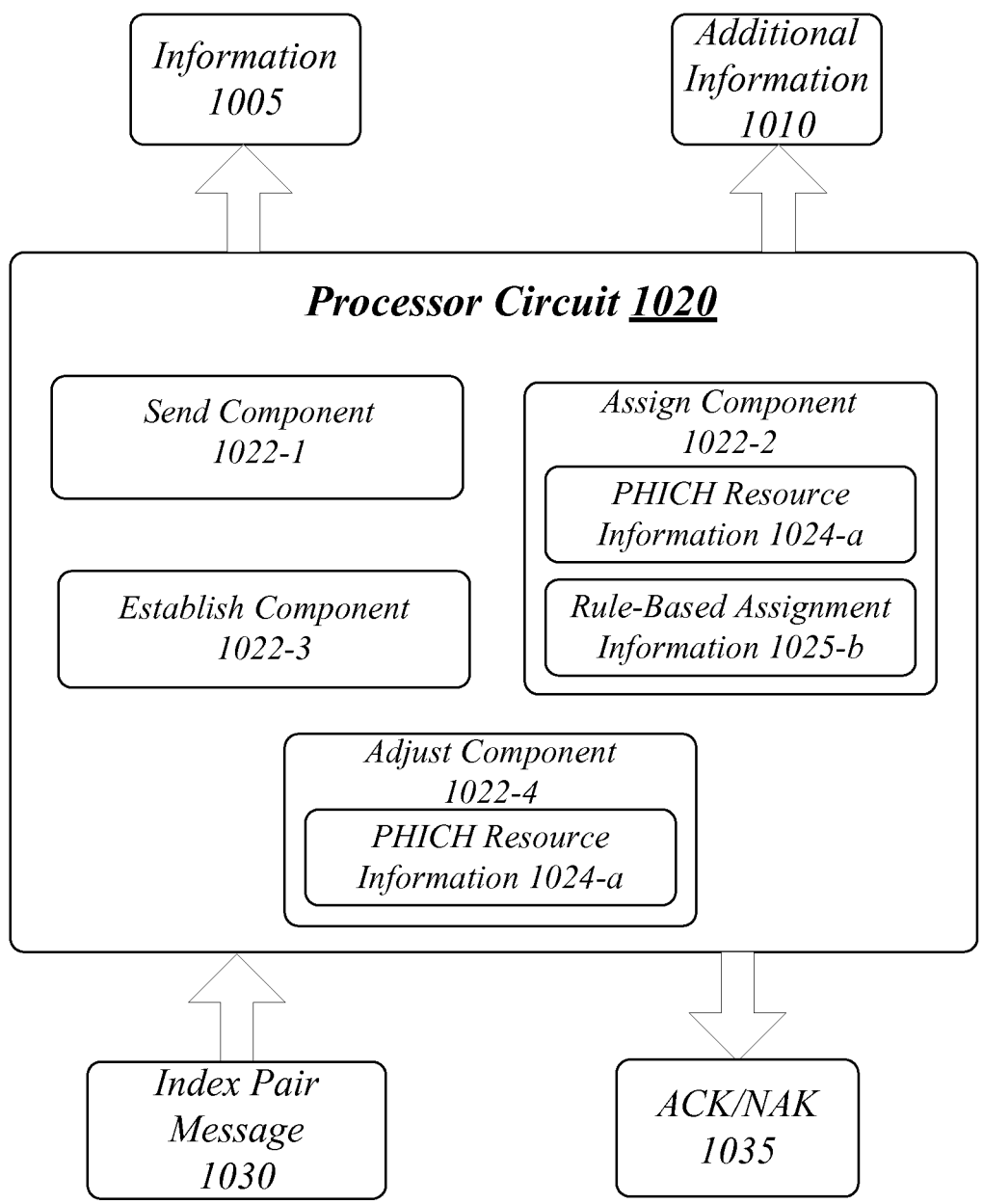
FIG. 10 illustrates an example block diagram for a second apparatus.

FIG. 10 illustrates a block diagram for an example second apparatus. As shown in FIG. 10, the example second apparatus includes apparatus 1000. Although apparatus 1000 shown in FIG. 10 has a limited number of elements in a certain topology, it may be appreciated that the apparatus 1000 may include more or less elements in alternate topologies as desired for a given implementation.

The apparatus 1000 may comprise a computer-implemented apparatus 1000 having a processor circuit 1020 arranged to execute one or more software components 1022-a. It is worthy to note that "a" and "b" and "c" and similar designators as used herein are intended to be variables representing any positive integer. Thus, for example, if an implementation sets a value for a=4, then a complete set of software components 1022-a may include components 1022-1, 1022-2, 1022-3 or 1022-4. The examples are not limited in this context.

According to some examples, apparatus 1000 may be implemented in network equipment such as an eNB (e.g., eNB 112) capable of operating in compliance with one or more 3GPP LTE Specifications including LTE-A in order to couple to an UE (e.g., UE 114). The examples are not limited in this context.

In some examples, as shown in FIG. 10, apparatus 1000 includes processor circuit 1020. Processor circuit 1020 may be generally arranged to execute one or more software components 1022-a. The processing circuit 1020 can be any of various commercially available processors to include but not limited to the processors mentioned above for apparatus 700. Also, according to some examples, processor circuit 1020 may also be an ASIC and at least some components 1022-a may be implemented as hardware elements of the ASIC.

According to some examples, apparatus 1000 may include a send component 1022-1. Send component 1022-1 may be executed by processor circuit 1020 to send information to an UE that may include an assigned PHICH resource represented by an index pair including a PHICH group number for a PHICH group and a PHICH sequence. The information may be included in information 1005.

In some examples, apparatus 1000 may also include an assign component 1022-2. Assign component 1022-2 may be executed by processor circuit 1020 to assign one or more additional PHICH resources to the UE based on a set number of PHICH resources or an adjustable number of PHICH resources. Assign component 1022-2 may dictate which PHICH resources are assigned via use of any one of the twelve rule-based assignments described above for FIG. 4 or may assign based on predetermined identifiers and then relay those predetermined identifiers with additional information 1010. According to some examples, assign component 1022-2 may allow the UE to identify the one or more additional PHICH resources based on the information sent with 1005 that indicates the initially assigned PHICH resource. Also, assign component 1022-2 may maintain information related to using rule-based assignments in rule-based assignment information 1025-b (e.g., in a LUT).

According to some examples, apparatus 1000 may also include an establish component 1022-3. Establish component 1022-3 may be executed by processor circuit 1020 to establish a PUSCH with the UE based, at least in part, on the assigned PHICH resource and the assigned one or more additional resources. The UE may indicate what index pairs (if the UE is able to select which pairs to use) are to be used via index pair message 1030. Also, the eNB including apparatus 1000 may convey HI using the assigned PHICH resources to the UE responsive to data transmissions sent via the established PUSCH. The HI may be included in ACK/NAK 1035.

In some examples, apparatus 1000 may also include an adjust component 1022-4. Establish component 1022-4 may be executed by processor circuit 1020 to adjust the adjustable number (if PHICH resources are adjustable) responsive to the eNB that includes apparatus 1000 managing PHICH overhead or avoiding a PHICH resource collision with the UE or another UE having a separate PUSCH established with the eNB. Adjust component 1022-4 may have access to PHICH resource information 1024-a to determine how or whether to adjust the adjustable number.

Various components of apparatus 1000 and a device implementing apparatus 1000 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 11 illustrates an example of a logic flow 1100. Logic flow 1100 may be representative of some or all of the operations executed by one or more logic, features, or devices described herein, such as apparatus 1000. More particularly, logic flow 1100 may be implemented by send component 1022-1, assign component 1022-2, establish component 1022-3 or adjust component 1022-4 for apparatus 1000 located at or with an eNB.

In the illustrated example shown in FIG. 11, logic flow 1100 at block 1102 may send, from an eNB capable of operating in compliance with one or more or more 3GPP LTE standards including LTE-A, information to an UE that includes an assigned PHICH resource represented by an index pair including a PHICH group number for a PHICH group and a PHICH sequence. In some examples, send component 1022-1 may send the information.

According to some examples, logic flow 1100 at block 1104 may assign one or more additional PHICH resources to the UE based on a set number of PHICH resources or an adjustable number of PHICH resources. For these examples, assign component 1022-2 may assign the one or more additional PHICH resources.

In some examples, logic flow 1100 at block 1106 may establish a PUSCH with the UE based, at least in part, on the assigned PHICH resource and the assigned one or more additional PHICH resources. For these examples, establish component 1022-3 may establish the PUSCH with the UE.

FIG. 12 illustrates an embodiment of a storage medium 1200. The storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
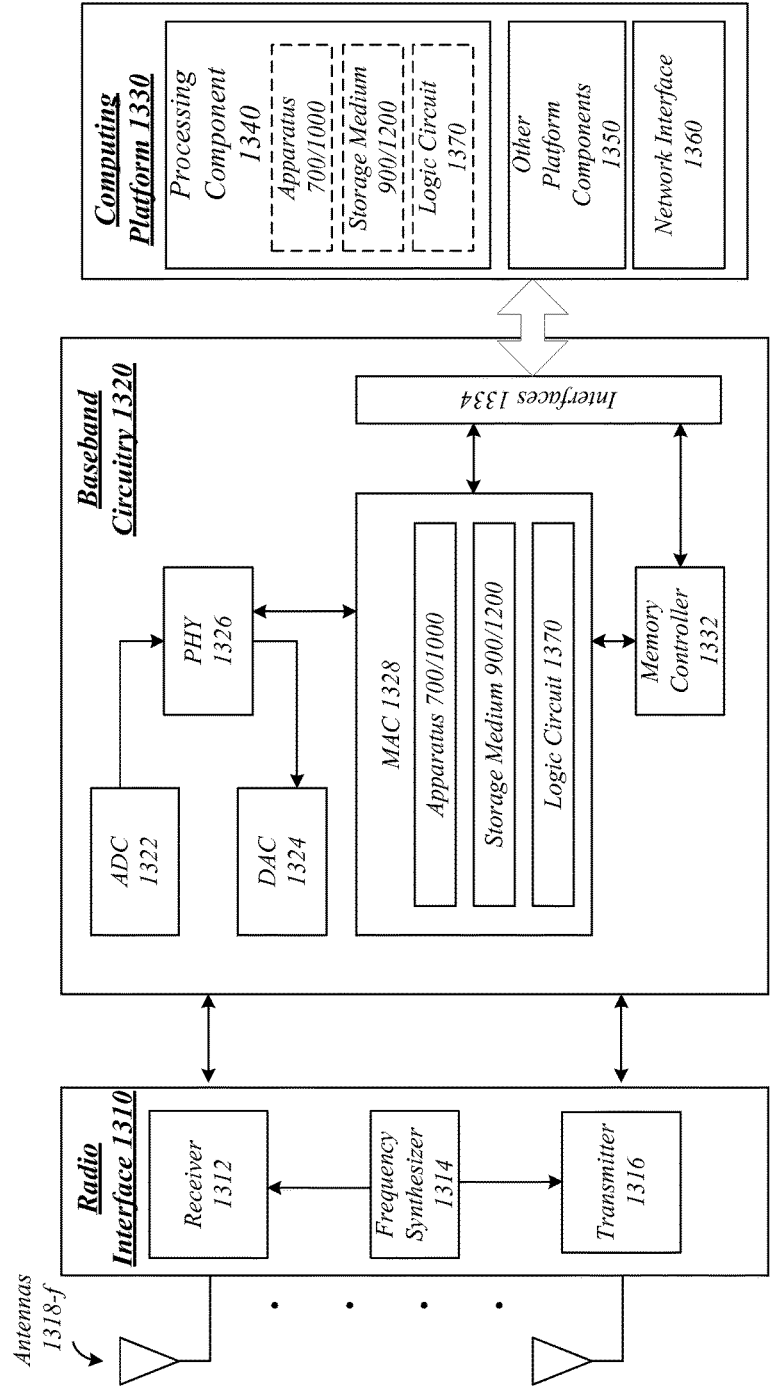
FIG. 13 illustrates an example of a device.

FIG. 13 illustrates an embodiment of a device 1300 for use in a broadband wireless access network. Device 1300 may implement, for example, apparatus 700/1000, storage medium 900/1200 and/or a logic circuit 1370. The logic circuit 1370 may include physical circuits to perform operations described for apparatus 700/1000. As shown in FIG. 13, device 1300 may include a radio interface 1310, baseband circuitry 1320, and computing platform 1330, although examples are not limited to this configuration.

The device 1300 may implement some or all of the structure and/or operations for the apparatus 700/1000, storage medium 900/1200 and/or logic circuit 1370 in a single computing entity, such as entirely within a single device. Alternatively, the device 1300 may distribute portions of the structure and/or operations for apparatus 700/1000, storage medium 900/1200 and/or logic circuit 1370 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318-f. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1326 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with MAC processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames (e.g., containing subframes). Alternatively or in addition, MAC processing circuit 1328 may share processing for certain of these functions or perform these processes independent of PHY processing circuit 1326. In some embodiments, MAC and PHY processing may be integrated into a single circuit.

Computing platform 1330 may provide computing functionality for device 1300. As shown, computing platform 1330 may include a processing component 1340. In addition to, or alternatively of, baseband circuitry 1320 of device 1300 may execute processing operations or logic for apparatus 1500/1800, storage medium 1700/2000, and logic circuit 1370 using the processing component 1330. Processing component 1340 (and/or PHY 1326 and/or MAC 1328) may comprise various hardware elements, software elements, or a combination of both. Examples of hardware elements may include devices, logic devices, components, processors, microprocessors, circuits, processor circuits (e.g., processor circuit 1520 or 1820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1330 may further include a network interface 1360. In some examples, network interface 1360 may include logic and/or features to support wireless network interfaces as described in one or more 3GPP LTE or LTE-A specifications or standards. For these examples, network interface 1360 may enable an apparatus 700 or 1000 located at respective UE and eNB to communicate with each other or with other networked devices.

Device 1300 may be, for example, a computer, a personal computer (PC), a desktop computer, a laptop computer, an ultrabook computer, a smartphone, a tablet computer, a notebook computer, a netbook computer, a work station, a mini-computer, multiprocessor m system, processor-based system, wireless access point, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1300 may be implemented using single input single output (SISO) architectures. However, certain implementations may include multiple antennas (e.g., antennas 1318-f) for transmission and/or reception using adaptive antenna techniques for beamforming or spatial division multiple access (SDMA) and/or using multiple input multiple output (MIMO) communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 14:
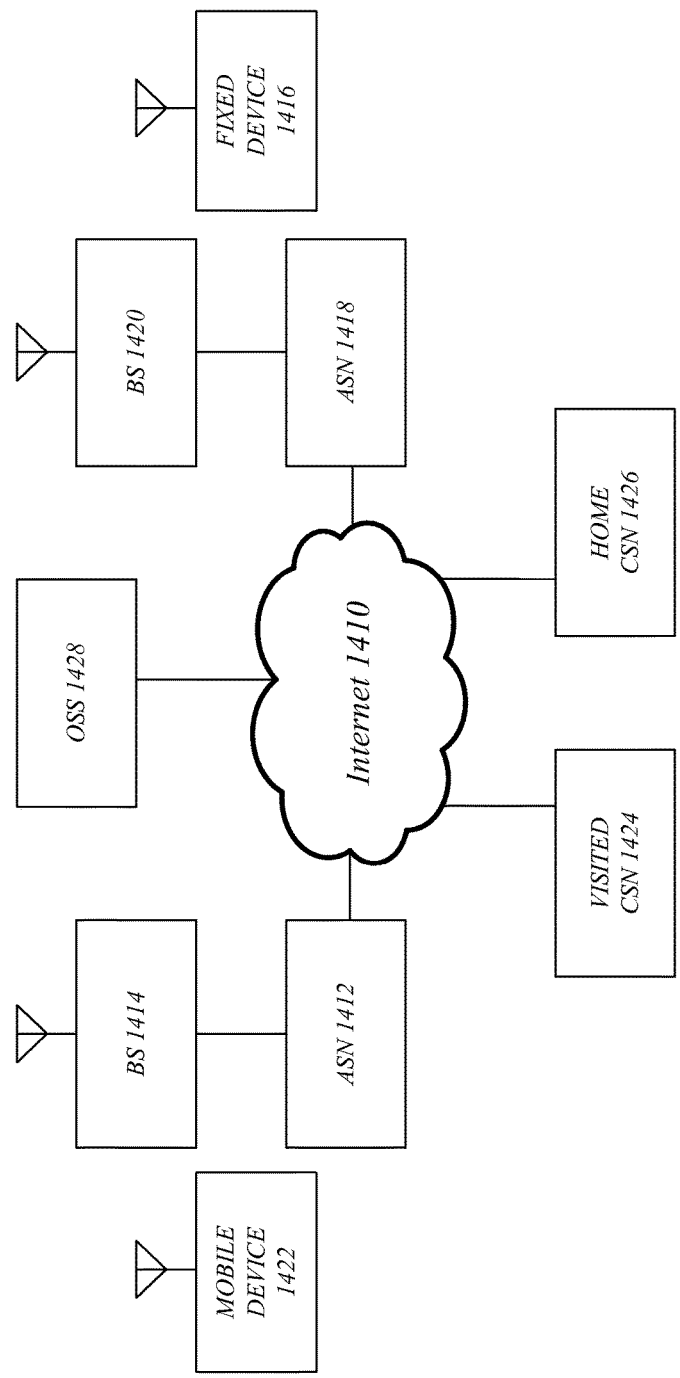
FIG. 14 illustrates an example of a broadband wireless access system.

FIG. 14 illustrates an embodiment of a broadband wireless access system 1400. As shown in FIG. 14, broadband wireless access system 1400 may be an internet protocol (IP) type network comprising an internet 1410 type network or the like that is capable of supporting mobile wireless access and/or fixed wireless access to internet 1410. In one or more embodiments, broadband wireless access system 1400 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1400, access service networks (ASN) 1414, 1418 are capable of coupling with base stations (BS) 1414, 1420 (RRHs or eNBs), respectively, to provide wireless communication between one or more fixed devices 1416 and internet 1410, or one or more mobile devices 1422 and Internet 1410. One example of a fixed device 1416 and a mobile device 1422 is UE 114, with the fixed device 1416 comprising a stationary version of UE 114 and the mobile device 1422 comprising a mobile version of UE 114. ASN 1412 may implement profiles that are capable of defining the mapping of network functions to one or more physical entities on broadband wireless access system 1400. Base stations 1414, 1420 (or eNBs) may comprise radio equipment to provide RF communication with fixed device 1416 and mobile device 1422, such as described with reference to device 1400, and may comprise, for example, the PHY, MAC, RLC or PDCP layer equipment in compliance with a 3GPP LTE Specification or an IEEE 802.16 Standard. Base stations 1414, 1420 (or eNBs) may further comprise an IP backplane to couple to Internet 1410 via ASN 1412, 1418, respectively, although the scope of the claimed subject matter is not limited in these respects.

Broadband wireless access system 1400 may further comprise a visited connectivity service network (CSN) 1424 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1424 or home CSN 1426, and the scope of the claimed subject matter is not limited in these respects. Visited CSN 1424 may be referred to as a visited CSN in the case where visited CSN 1424 is not part of the regular service provider of fixed device 1416 or mobile device 1422, for example where fixed 1416 or mobile device 1422 is roaming away from their respective home CSN 1426, or where broadband wireless access system 1400 is part of the regular service provider of fixed device 1416 or mobile device 1422 but where broadband wireless access system 1400 may be in another location or state that is not the main or home location of fixed device 1416 or mobile device 1422.

Fixed device 1416 may be located anywhere within range of one or both base stations 1414, 1420, such as in or near a home or business to provide home or business customer broadband access to Internet 1410 via base stations 1414, 1420 and ASN 1412, 1418, respectively, and home CSN 1426. It is worthy to note that although fixed device 1416 is generally disposed in a stationary location, it may be moved to different locations as needed. Mobile device 1422 may be utilized at one or more locations if mobile device 1422 is within range of one or both base stations 1414, 1420, for example.

In accordance with one or more embodiments, operation support system (OSS) 1428 may be part of broadband wireless access system 1400 to provide management functions for m broadband wireless access system 1400 and to provide interfaces between functional entities of broadband wireless access system 1400. Broadband wireless access system 1400 of FIG. 14 is merely one type of wireless network showing a certain number of the components of broadband wireless access system 1400, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include a processor circuit for an UE capable of operating in compliance with one or more 3GPP LTE standards including LTE-A. The apparatus may also include a receive component for execution by the processor circuit to receive information to establish a PUSCH with an eNB. The apparatus may also include an identify component for execution by the processor circuit to determine based on the information an identification of a PHICH resource represented by an index pair including a PHICH group number for a PHICH group and a PHICH sequence. The apparatus may also include an additional resource component for execution by the processor circuit to identify one or more additional PHICH resources based on further information received from the eNB by the receive component or use of a rule-based assignment.

Example 2

The apparatus of example 1, the further information including a number of identified index pairs for use as additional PHICH resources to enhance coverage for the UE via an established PUSCH with the eNB.

Example 3

The apparatus of example 2 may also include the additional resource component arranged to determine whether use of all or some of the number of identified index pairs is needed to enhance coverage. The apparatus of example 2 may also include an indicate component for execution by the processor circuit to indicate to the eNB which index pairs to use from among the number of identified index pairs based on the determination by the additional resource component.

Example 4

The apparatus of example 4, the additional resource component may cause repeated use of the determined identified index pairs in a time domain to further enhance coverage of the UE via the established PUSCH with the eNB.

Example 5

The apparatus of example 1, the identification of the PHICH resource by the identity component may be represented by the index pair $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH},$$

where $n_{DMRS}$ is mapped from a cyclic shift for a DMRS field in a most recent PDCCH with uplink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for TDD UL/DL configuration 0 with PUSCH transmission in subframe n=4 or 9, otherwise $N_{PHICH}^{group}$ is equal to 0, $I_{PRB\_RA} = I_{PRB\_RA}^{lowest\_index} + 1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA} = I_{PRB\_RA}^{lowest\_index}$ for a second TB of a PUSCH with associated PDCCH.

Example 6

The apparatus of example 5, the additional resource component to identify the one or more additional PHICH resources based on a total number of PHICH resources assigned by the eNB, the total number is represented by "N" and the one or more additional PHICH resources is represented by "N−1".

Example 7

The apparatus of example 6, use of the rule-based assignment by the additional resource component to identify the one or more additional PHICH resources may include the additional resource component to determine an identity in a consecutive manner by increasing $I_{PRB\_RA}^{lowest\_index}$ such that $$n_{PHICH}^{group} = (I_{PRB\_RA} + p + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} + p}{n_{PHICH}^{group}} \right\rfloor + n_{DMRS}\right) \bmod 2N_{SF}^{PHICH},$$

where p is any whole positive integer with a value of 1 to N−1.

Example 8

The apparatus of example 6, use of the rule-based assignment by the additional resource component to identify the one or more additional PHICH resources may include the additional resource component to determine an identity in a consecutive manner by decreasing $I_{PRB\_RA}^{lowest\_index}$ such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA} - p}{n_{PHICH}^{group}} \right\rfloor + n_{DMRS}\right) \bmod 2N_{SF}^{PHICH},$$

where p is any whole positive integer with a value of 1 to N−1.

Example 9

The apparatus of example 6, use of the rule-based assignment by the additional resource component to identify the one or more additional PHICH resources may include the additional resource component to determine an identity in a consecutive manner by increasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} + p\right) \bmod 2N_{SF}^{PHICH},$$

where p is any whole positive integer with a value of 1 to N−1.

Example 10

The apparatus of example 6, use of the rule-based assignment by the additional resource component to identify the one or more additional PHICH resources may include the additional resource component to determine an identity in a consecutive manner by decreasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} - p\right) \bmod 2N_{SF}^{PHICH},$$

where p is any whole positive integer with a value of 1 to N−1.

Example 11

The apparatus of example 6, use of the rule-based assignment by the additional resource component to identify the one or more additional PHICH resources may include the additional resource component to determine an identity in a consecutive manner by increasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 12

The apparatus of example 6, use of the rule-based assignment by the additional resource component to identify the one or more additional PHICH resources may include the additional resource component to determine an identity in a consecutive manner by decreasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 13

The apparatus of example 6, use of the rule-based assignment by the additional resource component to identify the one or more additional PHICH resources may include the additional resource component to determine an identity in a consecutive manner by increasing either PHICH group number or PHICH sequence such that $$n_{PHICH}^{group} = (I_{PRB\_RA} + p + n_{DMRS}) \bmod N_{PHICH}^{group} + I_{PHICH} N_{PHICH}^{group} \text{ and}$$

$$n_{PHICH}^{seq}\left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left(\left\lfloor \frac{I_{PRB\_RA+p}}{n_{PHICH}^{group}} \right\rfloor + n_{DMRS}\right) \bmod 2N_{SF}^{PHICH},$$

where p is any whole positive integer with a value of 1 to N−1.

Example 14

The apparatus of example 6, use of the rule-based assignment by the additional resource component to identify the one or more additional PHICH resources may include the additional resource component to determine an identity in a consecutive manner by decreasing either PHICH group number or PHICH sequence such that $$n_{PHICH}^{group} = (I_{PRB\_RA} - p + n_{DMRS}) \bmod N_{PHICH}^{group} + I_{PHICH} N_{PHICH}^{group} \text{ and}$$

$$n_{PHICH}^{seq} \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA} - p}{n_{PHICH}^{group}} \right\rfloor + n_{DMRS} \right) \bmod 2N_{SF}^{PHICH},$$

where p is any whole positive integer with a value of 1 to N−1.

Example 15

The apparatus of example 6, use of the rule-based assignment by the additional resource component to identify the one or more additional PHICH resources may include the additional resource component to determine an identity in a consecutive manner by increasing either PHICH group number or PHICH sequence such that $$n_{PHICH}^{group} = (I_{PRB\_RA} + n_{DMRS} + p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} + p \right) \bmod 2N_{SF}^{PHICH},$$

where p is any whole positive integer with a value of 1 to N−1.

Example 16

The apparatus of example 6, use of the rule-based assignment by the additional resource component to identify the one or more additional PHICH resources may include the additional resource component to determine an identity in a consecutive manner by decreasing either PHICH group number or PHICH sequence such that $$n_{PHICH}^{group} = (I_{PRB\_RA} + n_{DMRS} - p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA - p}}{n_{PHICH}^{group}} \right\rfloor + n_{DMRS} - p \right) \bmod 2N_{SF}^{PHICH},$$

where p is any whole positive integer with a value of 1 to N−1.

Example 17

The apparatus of example 6, use of the rule-based assignment by the additional resource component to identify the one or more additional PHICH resources may include the additional resource component to determine an identity in a consecutive manner by increasing either PHICH group number or PHICH sequence such that $n_{PHICH}^{group} = (n_{PHICH}^{group} + p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group}) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 18

The apparatus of example 6, use of the rule-based assignment by the additional resource component to identify the one or more additional PHICH resources may include the additional resource component to determine an identity in a consecutive manner by increasing either PHICH group number or PHICH sequence such that $n_{PHICH}^{group} = (n_{PHICH}^{group} - p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group} + p) \bmod N_{PHICH}^{group}$ and $n_{PHICH}^{seq} = (n_{PHICH}^{seq} - p) \bmod 2N_{SF}^{PHICH}$, where p is any whole positive integer with a value of 1 to N−1.

Example 19

The apparatus of example 1 may also include a digital display coupled to the processor circuit to present a user interface view.

Example 20

An example method may include receiving, at an UE capable of operating in compliance with one or more 3GPP LTE standards including LTE-A, information to establish a PUSCH with an eNB. The method may also include determining based on the information an identification of a PHICH resource represented by an index pair including a PHICH group number for a PHICH group and a PHICH sequence. The method may also include identifying one or more additional PHICH resources based on further information received from the eNB or using a rule-based assignment.

Example 21

The method of example 20, the further information may include a number of identified index pairs for use to enhance coverage for the UE via an established PUSCH with the eNB.

Example 22

The method of example 21 may also include determining whether to use all or some of the number of identified index pairs to enhance coverage for the UE. The method of example 21 may also include indicating to the eNB which identified index pairs to use from among the number of identified index pairs based on the determination.

Example 23

The method of example 22 may also include repeating use of the determined identified index pairs in a time domain to further enhance coverage for the UE.

Example 24

The method of example 20, may include the identification of the PHICH resource represented by the index air $((n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2 N_{SF}^{PHICH},$$

where $n_{DMRS}$ is mapped from a cyclic shift for a DMRS field in a most recent PDCCH with uplink downlink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for TDD UL/DL configuration 0 with PUSCH transmission in subframe n=4 or 9, otherwise $N_{PHICH}^{group}$ is equal to 0, $I_{PRB\_RA}=I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

Example 25

The method of example 24, identifying the one or more additional PHICH resources may be based on a total number of PHICH resources assigned by the eNB. For this example, the total number may be represented by "N" and the one or more additional PHICH resources is represented by "N−1".

Example 26

The method of example 25 may also include using the rule-based assignment to identify the one or more additional PHICH resources. For this example, the rule-based assignment may include determining an identity in a consecutive manner by increasing $I_{PRB\_RA}^{lowest\_index}$ such that $$n_{PHICH}^{group} = (I_{PRB\_RA} + p + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA+p}}{n_{PHICH}^{group}} \right\rfloor + n_{DMRS} \right) \bmod 2 N_{SF}^{PHICH},$$

where p is any whole positive integer with a value of 1 to N−1.

Example 27

The method of example 25 may also include using the rule-based assignment to identify the one or more additional PHICH resources. For this example, the rule-based assignment may include determining an identity in a consecutive manner by decreasing $I_{PRB\_RA}^{lowest\_index}$ such that $$n_{PHICH}^{group} = (I_{PRB\_RA} - p + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA-p}}{n_{PHICH}^{group}} \right\rfloor + n_{DMRS} \right) \bmod 2 N_{SF}^{PHICH},$$

where p is any whole positive integer with a value of 1 to N−1.

Example 28

The method of example 25 may also include using the rule-based assignment to identify the one or more additional PHICH resources. For this example, the rule-based assignment may include determining an identity in a consecutive manner by increasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} + p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} + p \right) \bmod 2 N_{SF}^{PHICH},$$

where p is any whole positive integer with a value of 1 to N−1.

Example 29

The method of example 25 may also include using the rule-based assignment to identify the one or more additional PHICH resources. For this example, the rule-based assignment may include determining an identity in a consecutive manner by decreasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} - p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} - p \right) \bmod 2 N_{SF}^{PHICH},$$

where p is any whole positive integer with a value of 1 to N−1.

Example 30

The method of example 25 may also include using the rule-based assignment to identify the one or more additional PHICH resources. For this example, the rule-based assignment may include determining an identity in a consecutive manner by increasing both PHICH group number and PHICH sequence induced from $I_{PRB\_RA}^{lowest\_index}$ such that that $n_{PHICH}^{group}=(n_{PHICH}^{group}+p) \bmod N_{PHICH}^{group}$ and $n_{PHICH}^{seq}=(n_{PHICH}^{seq}+p) \bmod 2N_{SF}^{PHICH}$, where p is any whole positive integer with a value of 1 to N−1.

Example 31

The method of example 25 may also include using the rule-based assignment to identify the one or more additional PHICH resources. For these examples, the rule-based assignment may include determining an identity in a consecutive manner by decreasing both PHICH group number and PHICH sequence induced from $I_{PRB\_RA}^{lowest\_index}$ such that that $n_{PHICH}^{group}=(n_{PHICH}^{group}+p) \bmod N_{PHICH}^{group}$ and $n_{PHICH}^{seq}=(n_{PHICH}^{seq}+p) \bmod 2N_{SF}^{PHICH}$, where p is any whole positive integer with a value of 1 to N−1.

Example 32

The method of example 25 may also include using the rule-based assignment to identify the one or more additional PHICH resources. For these examples, the rule-based assignment may also include determining an identity in a consecutive manner by increasing either PHICH group number or PHICH sequence such that $$n_{PHICH}^{group} = (I_{PRB\_RA} + p + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA+p}}{n_{PHICH}^{group}} \right\rfloor + n_{DMRS} \right) \bmod 2N_{SF}^{PHICH},$$

where p is any whole positive integer with a value of 1 to N−1.

Example 33

The method of example 25 may also include using the rule-based assignment to identify the one or more additional PHICH resources. For these examples, the rule-based assignment may include determining an identity in a consecutive manner by decreasing either PHICH group number or PHICH sequence such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA-p}}{n_{PHICH}^{group}} \right\rfloor + n_{DMRS} \right) \bmod 2N_{SF}^{PHICH},$$

where p is any whole positive integer with a value of 1 to N−1.

Example 34

The method of example 25 may also include using the rule-based assignment to identify the one or more additional PHICH resources. For these examples, the rule-based assignment may include determining an identity in a consecutive manner by increasing either PHICH group number or PHICH sequence such that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH},$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} + p \right) \bmod 2N_{SF}^{PHICH},$$

where p is any whole positive integer with a value of 1 to N−1.

Example 35

The method of example 25 may also include using the rule-based assignment to identify the one or more additional PHICH resources. For these examples, the rule-based assignment may include determining an identity in a consecutive manner by decreasing either PHICH group number or PHICH sequence such that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH},$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA-p}}{n_{PHICH}^{group}} \right\rfloor + n_{DMRS} - p \right) \bmod 2N_{SF}^{PHICH},$$

where p is any whole positive integer with a value of 1 to N−1.

Example 36

The method of example 25 may also include using the rule-based assignment to identify the one or more additional PHICH resources. For these examples, the rule-based assignment including determining an identity in a consecutive manner by increasing either PHICH group number or PHICH sequence such that $n_{PHICH}^{group}=(n_{PHICH}^{group}+p) \bmod N_{PHICH}^{group}$ and $n_{PHICH}^{seq}=(n_{PHICH}^{seq}) \bmod$ $2N_{SF}^{PHICH}$ and such that $n_{PHICH}^{group}=(n_{PHICH}^{group})\bmod N_{PHICH}^{group}$ and $n_{PHICH}^{seq}=(n_{PHICH}^{seq}+p)\bmod 2N_{SF}^{PHICH}$ where p is any whole positive integer with a value of 1 to N−1.

Example 37

The method of example 25 may also include using the rule-based assignment to identify the one or more additional PHICH resources. For this example, the rule-based assignment may include determining an identity in a consecutive manner by increasing either PHICH group number or PHICH sequence such that $n_{PHICH}^{group}=(n_{PHICH}^{group}-p)\bmod N_{PHICH}^{group}$ and $n_{PHICH}^{seq}=(n_{PHICH}^{seq})\bmod 2N_{SF}^{PHICH}$ and such that $n_{PHICH}^{group}=(n_{PHICH}^{group})\bmod N_{PHICH}^{group}$ and $n_{PHICH}^{seq}=(n_{PHICH}^{seq}-p)\bmod 2N_{SF}^{PHICH}$, where p is any whole positive integer with a value of 1 to N−1.

Example 38

An example at least one machine readable medium may include a plurality of instructions that in response to being executed on a system at an UE may cause the system to carry out a method according to any one of examples 20 to 37.

Example 39

An example apparatus may include means for performing the methods of any one of examples 20 to 37.

Example 40

An example at least one machine readable medium may include a plurality of instructions that in response to being executed on a system for an UE capable of operating in compliance with one or more or more 3GPP LTE standards including LTE-A may cause the system to receive information to establish a PUSCH with an eNB. The instructions may also cause the system to determine based on the information an identification of a PHICH resource represented by an index pair including a PHICH group number for a PHICH group and a PHICH sequence. The instructions may also cause the system to identify one or more additional PHICH resources based on further information received from the eNB or use a rule-based assignment.

Example 41

The at least one machine readable medium of example 40, the further information may include a number of identified index pairs for use to enhance coverage for the UE via an established PUSCH with the eNB.

Example 42

The at least one machine readable medium of example 41, the instructions may also cause the system to determine whether to use all or some of the number of identified index pairs to enhance coverage for the UE. The at least one machine readable medium of example 41 may also include the instruction to cause the system to indicate to the eNB which identified index pairs to use from among the number of identified index pairs based on the determination.

Example 43

The at least one machine readable medium of example 42 may also include the instructions to cause the system to repeat use of the determined identified index pairs in a time domain to further enhance coverage for the UE.

Example 44

The at least one machine readable medium of example 40, may include the identification of the PHICH resource represented by the index pair $(n_{PHICH}^{group},n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor\frac{I_{PRB\_RA}}{n_{PHICH}^{group}}\right\rfloor + n_{DMRS}\right) \bmod 2N_{SF}^{PHICH},$$

where $n_{DMRS}$ is mapped from a cyclic shift for a DMRS field in a most recent PDCCH with uplink downlink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for TDD UL/DL configuration 0 with PUSCH transmission in subframe n=4 or 9, otherwise $N_{PHICH}^{group}$ is equal to 0, $I_{PRB\_RA}=I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}^{lowest\_index}$ for a second TB of a PUSCH with associated PDCCH.

Example 45

The at least one machine readable medium of example 44, identifying the one or more additional PHICH resources may be based on a total number of PHICH resources assigned by the eNB. For this example, the total number may be represented by "N" and the one or more additional PHICH resources is represented by "N−1".

Example 46

The at least one machine readable medium of 45 may also include the instruction to cause the system to use the rule-based assignment to identify the one or more additional PHICH resources. For this example, use of the rule-based assignment may include determining an identity in a consecutive manner by increasing $I_{PRB\_RA}^{lowest\_index}$ such that $$n_{PHICH}^{group} = (I_{PRB\_RA} + p + n_{DMRS}) \bmod N_{PHICH}^{group} + I_{PHICH} N_{PHICH}^{group}$$

and $$n_{PHICH}^{seq} = \left(\left\lfloor\frac{I_{PRB\_RA} + p}{n_{PHICH}^{group}}\right\rfloor + n_{DMRS}\right) \bmod 2N_{SF}^{PHICH},$$

where p is any whole positive integer with a value of 1 to N−1.

Example 47

The at least one machine readable medium of example 45 may also include the instruction to cause the system to use the rule-based assignment to identify the one or more additional PHICH resources. For this example, use of the rule-based assignment may include determining an identity in a consecutive manner by decreasing $I_{PRB\_RA}^{lowest\_index}$ such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA} - p}{n_{PHICH}^{group}} \right\rfloor + n_{DMRS} \right) \bmod 2N_{SF}^{PHICH},$$

where p is any whole positive integer with a value of 1 to N−1.

Example 48

The at least one machine readable medium of example 45 may also include the instruction to cause the system to use the rule-based assignment to identify the one or more additional PHICH resources. For this example, use of the rule-based assignment may include determining an identity in a consecutive manner by increasing a parameter for determining the PHICH group number or PHICH sequence index induced from $I_{PRB\_RA}^{lowest\_index}$ such that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} + p \right) \bmod 2N_{SF}^{PHICH},$$

where p is any whole positive integer with a value of 1 to N−1.

Example 49

The at least one machine readable medium of example 45 may also include the instruction to cause the system to use the rule-based assignment to identify the one or more additional PHICH resources. For this example, use of the rule-based assignment may include determining an identity in a consecutive manner by decreasing a parameter for determining the PHICH group number or PHICH sequence index induced from $I_{PRB\_RA}^{lowest\_index}$ such that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} - p \right) \bmod 2N_{SF}^{PHICH},$$

where p is any whole positive integer with a value of 1 to N−1.

Example 50

The at least one machine readable medium of example 45 may also include the instruction to cause the system to use the rule-based assignment to identify the one or more additional PHICH resources. For this example, use of the rule-based assignment may include determining an identity in a consecutive manner by increasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 51

The at least one machine readable medium of example 45 may also include the instruction to cause the system to use the rule-based assignment to identify the one or more additional PHICH resources. For this example, use of the rule-based assignment may include determining an identity in a consecutive manner by decreasing both PHICH group number and PHICH sequence induced from $I_{PRB\_RA}^{lowest\_index}$ such that that $n_{PHICH}^{group} = (n_{PHICH}^{group} + p) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 52

The at least one machine readable medium of example 45 may also include the instruction to cause the system to use the rule-based assignment to identify the one or more additional PHICH resources. For this example, use of the rule-based assignment may also include determining an identity in a consecutive manner by increasing either PHICH group number or PHICH sequence such that $$n_{PHICH}^{group} = (I_{PRB\_RA} + p + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA+p}}{n_{PHICH}^{group}} \right\rfloor + n_{DMRS} \right) \bmod 2N_{SF}^{PHICH},$$

where p is any whole positive integer with a value of 1 to N−1.

Example 53

The at least one machine readable medium of example 45 may also include the instruction to cause the system to use the rule-based assignment to identify the one or more additional PHICH resources. For this example, use of the rule-based assignment may include determining an identity in a consecutive manner by decreasing either PHICH group number or PHICH sequence such that $$n_{PHICH}^{group} = (I_{PRB\_RA} - p + n_{DMRS}) \bmod N_{PHICH}^{group} + I_{PHICH} N_{PHICH}^{group}$$

and $$n_{PHICH}^{seq} = \left( \left\lfloor \frac{I_{PRB\_RA}}{n_{PHICH}^{group}} \right\rfloor + n_{DMRS} \right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA-p}}{n_{PHICH}^{group}} \right\rfloor + n_{DMRS}\right) \bmod 2N_{SF}^{PHICH},$$

where p is any whole positive integer with a value of 1 to N−1.

Example 54

The at least one machine readable medium of example 45 may also include the instruction to cause the system to use the rule-based assignment to identify the one or more additional PHICH resources. For these examples, the rule-based assignment may include determining an identity in a consecutive manner by increasing either PHICH group number or PHICH sequence such that $$n_{PHICH}^{group} = (I_{PRB\_RA} + n_{DMRS} + p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS} + p\right) \bmod 2N_{SF}^{PHICH},$$

where p is any whole positive integer with a value of 1 to N−1.

Example 55

The at least one machine readable medium of example 45 may also include the instruction to cause the system to use the rule-based assignment to identify the one or more additional PHICH resources. For these examples, the rule-based assignment may include determining an identity in a consecutive manner by decreasing either PHICH group number or PHICH sequence such that $$n_{PHICH}^{group} = (I_{PRB\_RA} + n_{DMRS} - p) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH}$$

or such that $$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA-p}}{n_{PHICH}^{group}} \right\rfloor + n_{DMRS} - p\right) \bmod 2N_{SF}^{PHICH},$$

where p is any whole positive integer with a value of 1 to N−1.

Example 56

The at least one machine readable medium of example 45 may also include the instruction to cause the system to use the rule-based assignment to identify the one or more additional PHICH resources. For this example, use of the rule-based assignment including determining an identity in a consecutive manner by increasing either PHICH group number or PHICH sequence such that $n_{PHICH}^{group} = (n_{PHICH}^{group} + p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group}) \bmod N_{PHICH}^{group}$ and $n_{PHICH}^{seq} = (n_{PHICH}^{seq} + p) \bmod 2N_{SF}^{PHICH}$, where p is any whole positive integer with a value of 1 to N−1.

Example 57

The at least one machine readable medium of example 45 may also include the instruction to cause the system to use the rule-based assignment to identify the one or more additional PHICH resources. For this example, use of the rule-based assignment may include determining an identity in a consecutive manner by increasing either PHICH group number or PHICH sequence such that $n_{PHICH}^{group} = (n_{PHICH}^{group} - p) \bmod N_{PHICH}^{group}$ and $n_{PHICH}^{seq} = (n_{PHICH}^{seq}) \bmod 2N_{SF}^{PHICH}$ and such that $n_{PHICH}^{group} = (n_{PHICH}^{group}) \bmod N_{PHICH}^{group}$ and $n_{PHICH}^{seq} = (n_{PHICH}^{seq} - p) \bmod 2N_{SF}^{PHICH}$, where p is any whole positive integer with a value of 1 to N−1.

Example 58

An example apparatus may include a processor circuit for an eNB capable of operating in compliance with one or more 3GPP LTE standards including LTE-A. The apparatus may also include a send component for execution by the processor circuit to send information to an UE that includes an assigned PHICH resource represented by an index pair including a PHICH group number for a PHICH group and a PHICH sequence. The apparatus may also include an assign component for execution by the processor circuit to assign one or more additional PHICH resources to the UE based on a set number of PHICH resources or an adjustable number of PHICH resources. The apparatus may also include an establish component for execution by the processor circuit to establish a PUSCH with the UE based, at least in part, on the assigned PHICH resource and the assigned one or more additional PHICH resources.

Example 59

The apparatus of example 58 may also include an adjust component for execution by the processor circuit to adjust the adjustable number responsive to the eNB managing PHICH overhead or avoiding a PHICH resource collision with the UE or another UE having a separate PUSCH established with the eNB.

Example 60

The apparatus of example 58, the assigned one or more additional PHICH resources may be for use to enhance coverage for the UE via the established PUSCH between the eNB and the UE.

Example 61

The apparatus of example 58, the index pair may include the PHICH group number and the PHICH sequence is identified as $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH},$$

where $n_{DMRS}$ is mapped from a cyclic shift for DMRS field in a most recent PDCCH with uplink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA} = I_{PRB\_RA}^{lowest\_index} + 1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA} = I_{PRB\_RA}^{lowest\_index}$ for a second TB of a PUSCH with associated PDCCH.

Example 62

The apparatus of example 61, the assigned PHICH resource and the one or more additional PHICH resources may include a total number of assigned PHICH resources that are represented by "N" and the one or more additionally assigned PHICH resources are represented by "N−1".

Example 63

The apparatus of example 62, use of the rule-based assignment by the assign component to identify the one or more additional PHICH resources may include the assign component to determine an identity in a consecutive manner by increasing or decreasing $I_{PRB\_RA}^{lowest\_index}$ for determining $(n_{PHICH}^{group}, n_{PHICH}^{seq})$.

Example 64

The apparatus of example 62, use of the rule-based assignment by the assign component to identify the one or more additional PHICH resources may include the assign component to determine an identity in a consecutive manner by increasing or decreasing the $n_{DMRS}$ parameter for determining $(n_{PHICH}^{group}, n_{PHICH}^{seq})$ induced from $I_{PRB\_RA}^{lowest\_index}$.

Example 65

The apparatus of example 62, use of the rule-based assignment by the assign component to identify the one or more additional PHICH resources may include the assign component to determine an identity in a consecutive manner by increasing or decreasing both the PHICH group number and PHICH sequence for determining $(n_{PHICH}^{group}, n_{PHICH}^{seq})$ induced from $I_{PRB\_RA}^{lowest\_index}$.

Example 66

The apparatus of example 62, use of the rule-based assignment by the assign component to identify the one or more additional PHICH resources may include the assign component to determine an identity in a consecutive manner by increasing or decreasing m the PHICH group number or PHICH sequence for determining $(n_{PHICH}^{group}, n_{PHICH}^{seq})$ induced from $I_{PRB\_RA}^{lowest\_index}$.

Example 67

The apparatus of example 58 may include a digital display coupled to the processor circuit to present a user interface view.

Example 68

An example method may include sending, at an eNB capable of operating in compliance with one or more 3GPP LTE standards including LTE-A, information to an UE that includes an assigned PHICH resource represented by an index pair including a PHICH group number for a PHICH group and a PHICH sequence. The method may also include assigning one or more additional PHICH resources to the UE based on a set number of PHICH resources or an adjustable number of PHICH resources. The method may also include establishing a PUSCH with the UE based, at least in part, on the assigned PHICH resource and the assigned one or more additional PHICH resources.

Example 69

The method of example 68 may also include adjusting the adjustable number responsive to the eNB managing PHICH overhead or avoiding a PHICH resource collision with the UE or another UE having a separate PUSCH established with the eNB.

Example 70

The method of example 68, the assigned one or more additional PHICH resources may be for use to enhance coverage for the UE via the established PUSCH between the eNB and the UE.

Example 71

The method of example 68, the index pair including the PHICH group number and the PHICH sequence is identified as $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

-continued and $$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH},$$

where $n_{DMRS}$ is mapped from a cyclic shift for DMRS field in a most recent PDCCH with uplink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA} = I_{PRB\_RA}^{lowest\_index} + 1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA} = I_{PRB\_RA}^{lowest\_index}$ for a second TB of a PUSCH with associated PDCCH.

Example 72

The method of example 71, the assigned PHICH resource and the one or more additional PHICH resources may include a total number of assigned PHICH resources that are represented by "N" and the one or more additionally assigned PHICH resources are represented by "N−1".

Example 73

The method of example 72 may also include using a rule-based assignment to identify the one or more assigned additional PHICH resources. For this example, the rule-based method may include determining an identity in a consecutive manner by increasing or decreasing $I_{PRB\_RA}^{lowest\_index}$ for determining $(n_{PHICH}^{group}, n_{PHICH}^{seq})$.

Example 74

The method of example 72 may also include using a rule-based assignment to identify the one or more assigned additional PHICH resources, the rule-based method including determining an identity in a consecutive manner by increasing or decreasing the $n_{DMRS}$ parameter for determining $(n_{PHICH}^{group}, n_{PHICH}^{seq})$ induced from $I_{PRB\_RA}^{lowest\_index}$.

Example 75

The method of example 72 may also include using a rule-based assignment to identify the one or more assigned additional PHICH resources, the rule-based method including determining an identity in a consecutive manner by increasing or decreasing both the PHICH group number and PHICH sequence for determining $(n_{PHICH}^{group}, n_{PHICH}^{seq})$ induced from $I_{PRB\_RA}^{lowest\_index}$.

Example 76

The method of example 72 may also include using a rule-based assignment to identify the one or more assigned additional PHICH resources, the rule-based method including determining an identity in a consecutive manner by increasing or decreasing the PHICH group number or PHICH sequence for determining $(n_{PHICH}^{group}, n_{PHICH}^{seq})$ induce from $I_{PRB\_RA}^{lowest\_index}$.

Example 77

An example at least one machine readable medium may include a plurality of instructions that in response to being executed on a system at an UE may cause the system to carry out a method according to any one of examples 68 to 76.

Example 78

An example apparatus may include means for performing the methods of any one of examples 68 to 76.

Example 79

An example at least one machine readable medium may include a plurality of instructions that in response to being executed on a system for an eNB capable of operating in compliance with one or more or more 3GPP LTE standards including LTE-A may cause the system to send information to an UE that includes an assigned PHICH resource represented by an index pair including a PHICH group number for a PHICH group and a PHICH sequence. The instructions may also cause the system to assign one or more additional PHICH resources to the UE based a set number of PHICH resources or an adjustable number of PHICH resources. The m instructions may also cause the system to establish a PUSCH with the UE based, at least in part, on the assigned PHICH resource and the assigned one or more additional PHICH resources.

Example 80

The least one machine readable medium of example 79, the instructions to may also cause the system to adjust the adjustable number responsive to managing PHICH overhead or avoiding a PHICH resource collision with the UE or another UE having a separate PUSCH established with the eNB.

Example 81

The least one machine readable medium of example 79, the assigned one or more additional PHICH resources may be for use to enhance coverage for the UE via the established PUSCH between the eNB and the UE.

Example 82

The least one machine readable medium of example 79, the index pair including the PHICH group number and the PHICH sequence is identified as $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \bmod 2N_{SF}^{PHICH},$$

where $n_{DMRS}$ is mapped from a cyclic shift for DMRS field in a most recent PDCCH with uplink DCI format for one or more TBs associated with a corresponding PUSCH transmission. Also, where $N_{SF}^{PHICH}$ is a spreading factor size used for PHICH modulation. Also, where $N_{PHICH}^{group}$ is a number of PHICH groups configured based on higher layer signaling with the eNB. Also, where $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA}=I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

Example 83

The least one machine readable medium of example 82, the assigned PHICH resource and the one or more additional PHICH resources may include a total number of assigned PHICH resources that are represented by "N" and the one or more additionally assigned PHICH resources are represented by "N−1".

Example 84

The least one machine readable medium of example 82, use of the rule-based assignment to identify the one or more additional PHICH resources may include determining an identity in a consecutive manner by increasing or decreasing $I_{PRB\_RA}^{lowest\_index}$ for determining $(n_{PHICH}^{group}, n_{PHICH}^{seq})$.

Example 85

The least one machine readable medium of example 82, use of the rule-based assignment to identify the one or more additional PHICH resources may include determining an identity in a consecutive manner by increasing or decreasing the $n_{DMRS}$ parameter for determining $(n_{PHICH}^{group}, n_{PHICH}^{seq})$ induced from $I_{PRB\_RA}^{lowest\_index}$.

Example 86

The least one machine readable medium of example 82, use of the rule-based assignment to identify the one or more additional PHICH resources may include determining an identity in a consecutive manner by increasing or decreasing both the PHICH group number and PHICH sequence for determining $(n_{PHICH}^{group}, n_{PHICH}^{seq})$ induced from $I_{PRB\_RA}^{lowest\_index}$.

Example 87

The least one machine readable medium of example 82, use of the rule-based assignment to identify the one or more additional PHICH resources may include determining an identity in a consecutive manner by increasing or decreasing the PHICH group number or PHICH sequence for determining $(n_{PHICH}^{group}, n_{PHICH}^{seq})$ induced from $I_{PRB\_RA}^{lowest\_index}$.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a processor circuit for user equipment (UE) capable of operating in compliance with one or more 3$^{rd}$ Generation Partnership Project (3GPP) Long Term Evolution (LTE) standards including LTE-Advanced (LTE-A);
   a receive component for execution by the processor circuit to receive information to establish a physical uplink shared channel (PUSCH) with an evolved Node B (eNB);
   an identify component for execution by the processor circuit to determine based on the information an identification of a physical hybrid automatic repeat request (HARQ) indicator channel (PHICH) resource represented by an index pair including a PHICH group number for a PHICH group and a PHICH sequence; and
   an additional resource component for execution by the processor circuit to identify one or more additional PHICH resources based on further information received from the eNB by the receive component or use of a rule-based assignment;
   wherein the further information is to include a number of identified index pairs for use as additional PHICH resources to enhance coverage for the UE via an established PUSCH with the eNB;
   wherein the additional resource component is to determine whether use of all or some of the number of identified index pairs is needed to enhance coverage; and
   further comprising an indicate component for execution by the processor circuit to indicate to the eNB which index pairs to use from among the number of identified index pairs based on the determination by the additional resource component;
   wherein the additional resource component is to cause repeated use of the determined identified index pairs in a time domain to further enhance coverage of the UE via the established PUSCH with the eNB.

2. The apparatus of claim 1, comprising the identification of the PHICH resource by the identity component is represented by the index pair $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2 N_{SF}^{PHICH},$$

where $n_{DMRS}$ is mapped from a cyclic shift for a demodulation reference signal (DMRS) field in a most recent physical downlink control channel (PDCCH) with uplink downlink control information (DCI) format for one or more transport blocks (TBs) associated with a corresponding PUSCH transmission, $N_{SF}^{PHICH}$ is a spreading factor size used for PHICH modulation, $N_{PHICH}^{group}$ is a number of PHICH groups configured based on higher layer signaling with the eNB, $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA}=I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

3. The apparatus of claim 1, comprising a digital display coupled to the processor circuit to present a user interface view.

4. A method comprising:
receiving, at user equipment (UE) capable of operating in compliance with one or more 3$^{rd}$ Generation Partnership Project (3GPP) Long Term Evolution (LTE) standards including LTE-Advanced (LTE-A), information to establish a physical uplink shared channel (PUSCH) with an evolved Node B (eNB);
determining based on the information an identification of a physical hybrid automatic repeat request (HARQ) indicator channel (PHICH) resource represented by an index pair including a PHICH group number for a PHICH group and a PHICH sequence; and
identifying one or more additional PHICH resources based on further information received from the eNB or using a rule-based assignment, wherein the identified PHICH resources are represented by the index pair $(n_{PHICH}^{group}, n_{PHICH}^{seq})$ where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} \right) \bmod 2 N_{SF}^{PHICH},$$

where $n_{DMRS}$ is mapped from a cyclic shift for a demodulation reference signal (DMRS) field in a most recent physical downlink control channel (PDCCH) with uplink downlink control information (DCI) format for one or more transport blocks (TBs) associated with a corresponding PUSCH transmission, $N_{SF}^{PHICH}$ is a spreading factor size used for PHICH modulation, $N_{PHICH}^{group}$ is a number of PHICH groups configured based on higher layer signaling with the eNB, $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA}=I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

5. The method of claim 4, the further information including a number of identified index pairs for use to enhance coverage for the UE via an established PUSCH with the eNB.

6. The method of claim 4, identifying the one or more additional PHICH resources based on a total number of PHICH resources assigned by the eNB, the total number is represented by "N" and the one or more additional PHICH resources is represented by "N−1".

7. The method of claim 6, comprising using the rule-based assignment to identify the one or more additional PHICH resources comprises determining an identity in a consecutive manner by increasing or decreasing $I_{PRB\_RA}^{lowest\_index}$ for determining $(n_{PHICH}^{group}, n_{PHICH}^{seq})$.

8. The method of claim 6, comprising using the rule-based assignment to identify the one or more additional PHICH resources, the rule-based assignment including determining an identity in a consecutive manner by increasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} + p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} + p \right) \bmod 2 N_{SF}^{PHICH},$$

where p is any whole positive integer with a value of 1 to N−1.

9. The method of claim 6, comprising using the rule-based assignment to identify the one or more additional PHICH resources, the rule-based assignment including determining an identity in a consecutive manner by decreasing a parameter for determining the PHICH group number or PHICH sequence index induced from $I_{PRB\_RA}^{lowest\_index}$ such that that $$n_{PHICH}^{group} = (I_{PRB\_RA} + n_{DMRS} - p) \bmod N_{PHICH}^{group} + I_{PHICH} N_{PHICH}^{group} \text{ and}$$

$$n_{PHICH}^{seq} = \left( \left\lfloor \frac{I_{PRB\_RA}}{n_{PHICH}^{group}} \right\rfloor + n_{DMRS} - p \right) \bmod 2 N_{SF}^{PHICH},$$

where p is any whole positive integer with a value of 1 to N−1.

10. The method of claim 6, comprising using the rule-based assignment to identify the one or more additional PHICH resources, the rule-based assignment including determining an identity in a consecutive manner by increasing both PHICH group number and PHICH sequence induced from $I_{PRB\_RA}^{lowest\_index}$ such that that $n_{PHICH}^{group}=(n_{PHICH}^{group}+p) \bmod N_{PHICH}^{group}$ and $n_{PHICH}^{seq}=(n_{PHICH}^{seq}+p) \bmod 2N_{SF}^{PHICH}$, where p is any whole positive integer with a value of 1 to N−1.

11. The method of claim 6, comprising using the rule-based assignment to identify the one or more additional PHICH resources, the rule-based assignment including determining an identity in a consecutive manner by decreasing both PHICH group number and PHICH sequence induced from $I_{PRB\_RA}^{lowest\_index}$ such that that $n_{PHICH}^{group}=$ $(n_{PHICH}^{group}+p) \mod N_{PHICH}^{group}$ and $n_{PHICH}^{seq}=(n_{PHICH}^{seq}+p) \mod 2N_{SF}^{PHICH}$, where p is any whole positive integer with a value of 1 to N−1.

12. The method of claim 6, comprising using the rule-based assignment to identify the one or more additional PHICH resources, the rule-based assignment including determining an identity in a consecutive manner by increasing either PHICH group number or PHICH sequence such that $$n_{PHICH}^{group} = (I_{PRB\_RA} + p + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH}$$

or such that $$n_{PHICH}^{group} = (I_{PRB\_RA} + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA+p}}{n_{PHICH}^{group}} \right\rfloor + n_{DMRS}\right) \mod 2N_{SF}^{PHICH},$$

where p is any whole positive integer with a value of 1 to N−1.

13. The method of claim 6, comprising using the rule-based assignment to identify the one or more additional PHICH resources, the rule-based assignment including determining an identity in a consecutive manner by decreasing either PHICH group number or PHICH sequence such that $$n_{PHICH}^{group} = (I_{PRB\_RA} - p + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH}$$

or such that $$n_{PHICH}^{group} = (I_{PRB\_RA} + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA-p}}{n_{PHICH}^{group}} \right\rfloor + n_{DMRS}\right) \mod 2N_{SF}^{PHICH},$$

where p is any whole positive integer with a value of 1 to N−1.

14. The method of claim 6, comprising using the rule-based assignment to identify the one or more additional PHICH resources, the rule-based assignment including determining an identity in a consecutive manner by increasing either PHICH group number or PHICH sequence such that $$n_{PHICH}^{group} = (I_{PRB\_RA} + n_{DMRS} + p) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH}$$

or such that $$n_{PHICH}^{group} = (I_{PRB\_RA} + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS} + p\right) \mod 2N_{SF}^{PHICH},$$

where p is any whole positive integer with a value of 1 to N−1.

15. The method of claim 6, comprising using the rule-based assignment to identify the one or more additional PHICH resources, the rule-based assignment including determining an identity in a consecutive manner by decreasing either PHICH group number or PHICH sequence such that $$n_{PHICH}^{group} = (I_{PRB\_RA} + n_{DMRS} - p) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH}$$

or such that $$n_{PHICH}^{group} = (I_{PRB\_RA} + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA-p}}{n_{PHICH}^{group}} \right\rfloor + n_{DMRS} - p\right) \mod 2N_{SF}^{PHICH},$$

where p is any whole positive integer with a value of 1 to N−1.

16. The method of claim 6, comprising using the rule-based assignment to identify the one or more additional PHICH resources, the rule-based assignment including determining an identity in a consecutive manner by increasing either PHICH group number or PHICH sequence such that $n_{PHICH}^{group}=(n_{PHICH}^{group}+p) \mod N_{PHICH}^{group}$ and $n_{PHICH}^{seq}=(n_{PHICH}^{seq}) \mod 2N_{SF}^{PHICH}$ and such that $n_{PHICH}^{group}=(n_{PHICH}^{group}) \mod N_{PHICH}^{group}$ and $n_{PHICH}^{seq}=(n_{PHICH}^{seq}+p) \mod 2N_{SF}^{PHICH}$, where p is any whole positive integer with a value of 1 to N−1.

17. The method of claim 6, comprising using the rule-based assignment to identify the one or more additional PHICH resources, the rule-based assignment including determining an identity in a consecutive manner by increasing either PHICH group number or PHICH sequence such that $n_{PHICH}^{group}=(n_{PHICH}^{group}-p) \mod N_{PHICH}^{group}$ and $n_{PHICH}^{seq}=(n_{PHICH}^{seq}) \mod 2N_{SF}^{PHICH}$ and such that $n_{PHICH}^{group}=(n_{PHICH}^{group}) \mod N_{PHICH}^{group}$ and $n_{PHICH}^{seq}=(n_{PHICH}^{seq}-p) \mod 2N_{SF}^{PHICH}$, where p is any whole positive integer with a value of 1 to N−1.

18. At least one non-transitory machine readable medium comprising a plurality of instructions that in response to being executed on a system for an evolved Node B (eNB) capable of operating in compliance with one or more or more 3$^{rd}$ Generation Partnership Project (3GPP) Long Term Evolution (LTE) standards including LTE-Advanced (LTE-A) causes the system to:

send information to user equipment (UE) that includes an assigned physical hybrid automatic repeat request (HARQ) indicator channel (PHICH) resource represented by an index pair including a PHICH group number for a PHICH group and a PHICH sequence;

assign one or more additional PHICH resources to the UE based a set number of PHICH resources or an adjustable number of PHICH resources; and establish a physical uplink shared channel (PUSCH) with the UE based, at least in part, on the assigned PHICH resource and the assigned one or more additional PHICH resources;
wherein the index pair includes the PHICH group number and the PHICH sequence is identified as $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \mod N_{PHICH}^{group} + I_{PHICH} N_{PHICH}^{group} \text{ and}$$

$$n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH},$$

where $n_{DMRS}$ is mapped from a cyclic shift for demodulation reference signal (DMRS) field in a most recent physical downlink control channel (PDCCH) with uplink downlink control information (DCI) format for one or more transport blocks (TBs) associated with a corresponding PUSCH transmission, $N_{SF}^{PHICH}$ is a spreading factor size used for PHICH modulation, $N_{PHICH}^{group}$ is a number of PHICH groups configured based on higher layer signaling with the eNB, $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA}^{lowest\_index}+1$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

19. The at least one non-transitory machine readable medium of claim 18, comprising the instructions to further cause the system to:
adjust the adjustable number responsive to managing PHICH overhead or avoiding a PHICH resource collision with the UE or another UE having a separate PUSCH established with the eNB.

20. The at least one non-transitory machine readable medium of claim 18, the assigned one or more additional PHICH resources for use to enhance coverage for the UE via the established PUSCH between the eNB and the UE.

21. An apparatus comprising:
a processor circuit for user equipment (UE) capable of operating in compliance with one or more 3$^{rd}$ Generation Partnership Project (3GPP) Long Term Evolution (LTE) standards including LTE-Advanced (LTE-A);
a receive component for execution by the processor circuit to receive information to establish a physical uplink shared channel (PUSCH) with an evolved Node B (eNB);
an identify component for execution by the processor circuit to determine based on the information an identification of a physical hybrid automatic repeat request (HARQ) indicator channel (PHICH) resource represented by an index pair including a PHICH group number for a PHICH group and a PHICH sequence; and
an additional resource component for execution by the processor circuit to identify one or more additional PHICH resources based on further information received from the eNB by the receive component or use of a rule-based assignment, wherein the identification of the PHICH resource by the identity component is represented by the index pair $(n_{PHICH}^{group}, n_{PHICH}^{seq})$, where $n_{PHICH}^{group}$ is the group number and $n_{PHICH}^{seq}$ is an orthogonal sequence index within the group as defined by:

$$n_{PHICH}^{group} = (I_{PRB\_RA} + n_{DMRS}) \mod N_{PHICH}^{group} + I_{PHICH} H_{PHICH}^{group} \text{ and } n_{PHICH}^{seq} = \left(\left\lfloor \frac{I_{PRB\_RA}}{n_{PHICH}^{group}} \right\rfloor + n_{DMRS}\right) \mod 2N_{SF}^{PHICH},$$

where $n_{DMRS}$ is mapped from a cyclic shift for a demodulation reference signal (DMRS) field in a most recent physical downlink control channel (PDCCH) with uplink downlink control information (DCI) format for one or more transport blocks (TBs) associated with a corresponding PUSCH transmission, $N_{SF}^{PHICH}$ is a spreading factor size used for PHICH modulation, $N_{PHICH}^{group}$ is a number of PHICH groups configured based on higher layer signaling with the eNB, $I_{PHICH}$ is equal to 1 for time division duplex (TDD) uplink/downlink (UL/DL) configuration 0 with PUSCH transmission in subframe n=4 or 9, otherwise $N_{PHICH}^{group}$ is equal to 0, $I_{PRB\_RA}=I_{PRB\_RA}^{lowest\_index}$ for a first TB of a PUSCH with associated PDCCH or for a case of no associated PDCC when a number of negatively acknowledged TBs is not equal to a number of TBs indicated in a most recent PDCCH associated with a corresponding PUSCH or $I_{PRB\_RA}=I_{PRB\_RA}^{lowest\_index}$ for a second TB of a PUSCH with associated PDCCH.

* * * * *

UNITED STATES PATENT AND TRADEMARK OFFICE
CERTIFICATE OF CORRECTION

PATENT NO. : 10,003,994 B2
APPLICATION NO. : 15/022484
DATED : June 19, 2018
INVENTOR(S) : Seunghee Han et al.

Page 1 of 2

It is certified that error appears in the above-identified patent and that said Letters Patent is hereby corrected as shown below:

On the Title Page

In item (73), Column 1, Line 1, in Assignee, delete "Intel Corporation" and insert -- INTEL IP CORPORATION --, therefor.

In the Claims

In Column 42, Line 26, in Claim 8, after "such" delete "that".

In Column 42, Line 42, in Claim 9, after "such" delete "that".

In Column 42, Line 58, in Claim 10, after "such" delete "that".

In Column 42, Line 59, in Claim 10, delete "mod $N_{PHICH}^{group}$" and insert -- mod$N_{PHICH}^{group}$ --, therefor.

In Column 42, Line 60, in Claim 10, delete "mod $2N_{SF}^{PHICH}$," and insert -- mod$2N_{SF}^{PHICH}$, --, therefor.

In Column 42, Line 67, in Claim 11, after "such" delete "that".

In Column 43, Line 1, in Claim 11, delete "mod $N_{PHICH}^{group}$" and insert -- mod$N_{PHICH}^{group}$ --, therefor.

In Column 43, Line 2, in Claim 11, delete "mod $2N_{SF}^{PHICH}$," and insert -- mod$2N_{SF}^{PHICH}$, --, therefor.

In Column 44, Line 37, in Claim 16, delete "mod $N_{PHICH}^{group}$" and insert -- mod$N_{PHICH}^{group}$ --, therefor.

Signed and Sealed this
Sixteenth Day of October, 2018

Andrei Iancu
*Director of the United States Patent and Trademark Office*

In Column 44, Line 38, in Claim 16, delete "mod $2N_{SF}^{PHICH}$" and insert -- $mod2N_{SF}^{PHICH}$ --, therefor.

In Column 44, Line 39, in Claim 16, delete "mod $N_{PHICH}^{group}$" and insert -- $modN_{PHICH}^{group}$ --, therefor.

In Column 44, Line 40, in Claim 16, delete "mod $2N_{SF}^{PHICH}$" and insert -- $mod2N_{SF}^{PHICH}$ --, therefor.